(12) United States Patent
Kubota et al.

(10) Patent No.: US 8,200,081 B2
(45) Date of Patent: Jun. 12, 2012

(54) IMAGE CAPTURING APPARATUS AND METHOD FOR CONTROLLING SAME

(75) Inventors: Akira Kubota, Yokohama (JP); Yasutaka Naka, Tokyo (JP); Hiroyuki Ogino, Yokohama (JP); Nobukazu Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 12/870,385

(22) Filed: Aug. 27, 2010

(65) Prior Publication Data

US 2010/0316365 A1 Dec. 16, 2010

Related U.S. Application Data

(63) Continuation of application No. 12/172,308, filed on Jul. 14, 2008, now Pat. No. 7,809,260.

(30) Foreign Application Priority Data

Aug. 2, 2007 (JP) ................................ 2007-202237
Aug. 3, 2007 (JP) ................................ 2007-203407

(51) Int. Cl.
*G03B 3/00* (2006.01)
*G03B 13/00* (2006.01)
*H04N 5/232* (2006.01)
*G02B 7/04* (2006.01)
*G02B 27/40* (2006.01)

(52) U.S. Cl. ........ 396/124; 396/121; 396/125; 348/346; 348/350; 250/201.2

(58) Field of Classification Search .................. 396/121, 396/124, 125–128; 348/345, 346, 348–350, 348/353–356; 250/201.2, 201.4, 201.6–201.8
See application file for complete search history.

(56) References Cited

U.S. PATENT DOCUMENTS 7,809,260 B2 * 10/2010 Kubota et al. ................. 396/124
2005/0219403 A1 * 10/2005 Hyodo .......................... 348/349
(Continued)

FOREIGN PATENT DOCUMENTS

JP 10-170814 A 6/1998
(Continued)

OTHER PUBLICATIONS

The above references were cited in a Jul. 1, 2011 Japanese Office Action, which is enclosed without English Translation, that issued in Japanese Patent Application No. 2007-202237.

(Continued)

*Primary Examiner* — Rochelle-Ann J Blackman
(74) *Attorney, Agent, or Firm* — Cowan, Liebowitz & Latman, P.C.

(57) ABSTRACT

The present invention further improves operability related to setting the position and size of a focus detection region. An image capturing apparatus of the invention is provided with an image sensor that photo-electrically converts an object image formed by an optical lens, a focus detection unit that detects the focus state of the object image using an image signal from a focus detection region that is a region that is a portion within a frame of the image sensor, a setting unit that sets one focus detection mode from among a plurality of focus detection modes in which the size and position of the focus detection region within the frame differ, and a storage unit that stores a focus detection region size and position for each of the plurality of focus detection modes.

10 Claims, 22 Drawing Sheets

U.S. PATENT DOCUMENTS

2007/0160359 A1* 7/2007 Imamura .................. 396/238

FOREIGN PATENT DOCUMENTS

| | | |
|---|---|---|
| JP | 2003-295048 A | 10/2003 |
| JP | 2004-294873 A | 10/2004 |
| JP | 2006-178308 A | 7/2006 |
| JP | 2007-011054 A | 1/2007 |
| JP | 2007-178576 A | 7/2007 |
| WO | 2006-082967 A | 8/2006 |

OTHER PUBLICATIONS

The above references were cited in a Sep. 16, 2011 Japanese Office Action, which is enclosed without English Translation, that issued in Japanese Patent Application No. 2007-203407.

The above references were cited in a Feb. 27, 2012 Japanese Office Action, which is enclosed without English Translation, that issued in Japanese Patent Application No. 2007-203407.

* cited by examiner

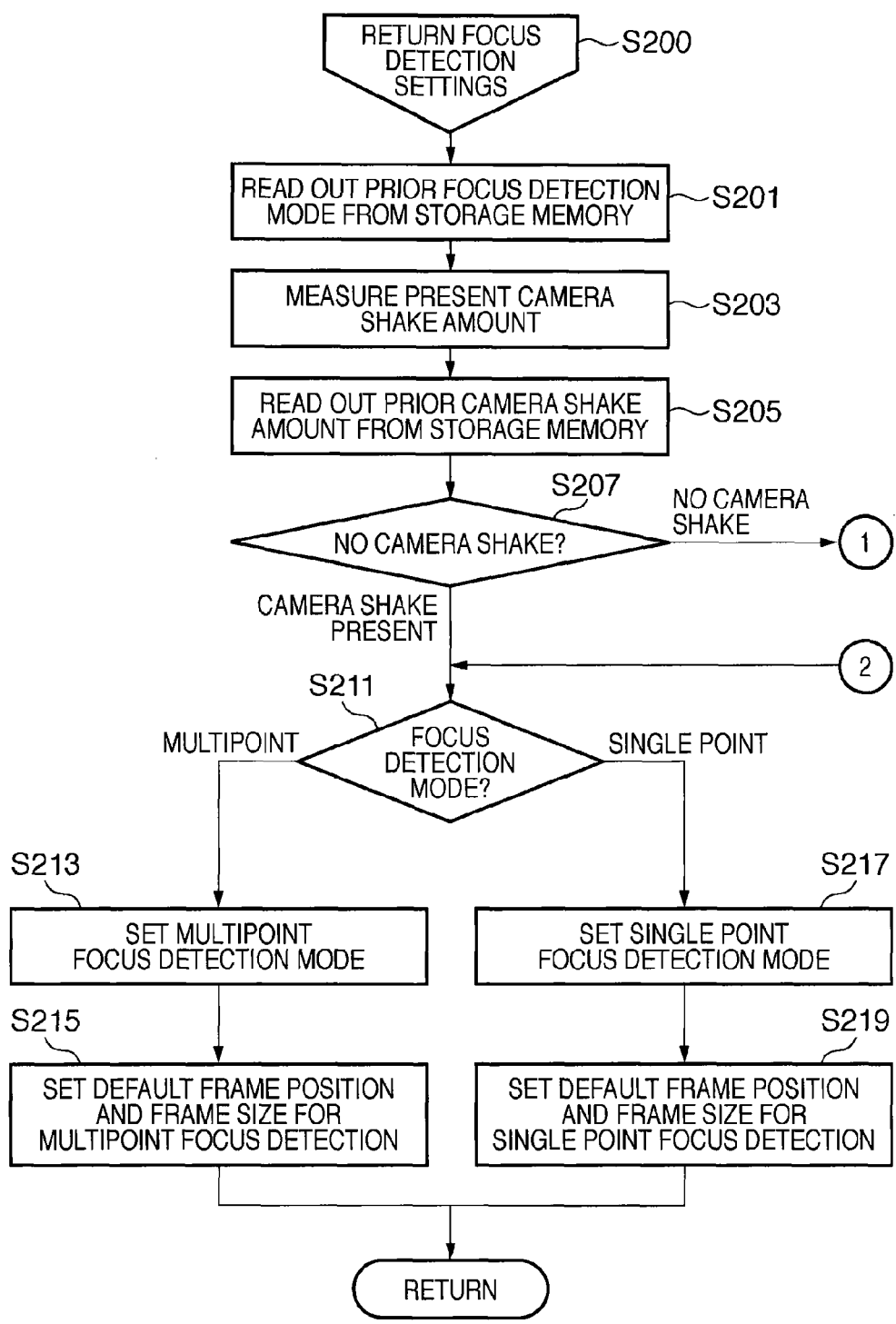

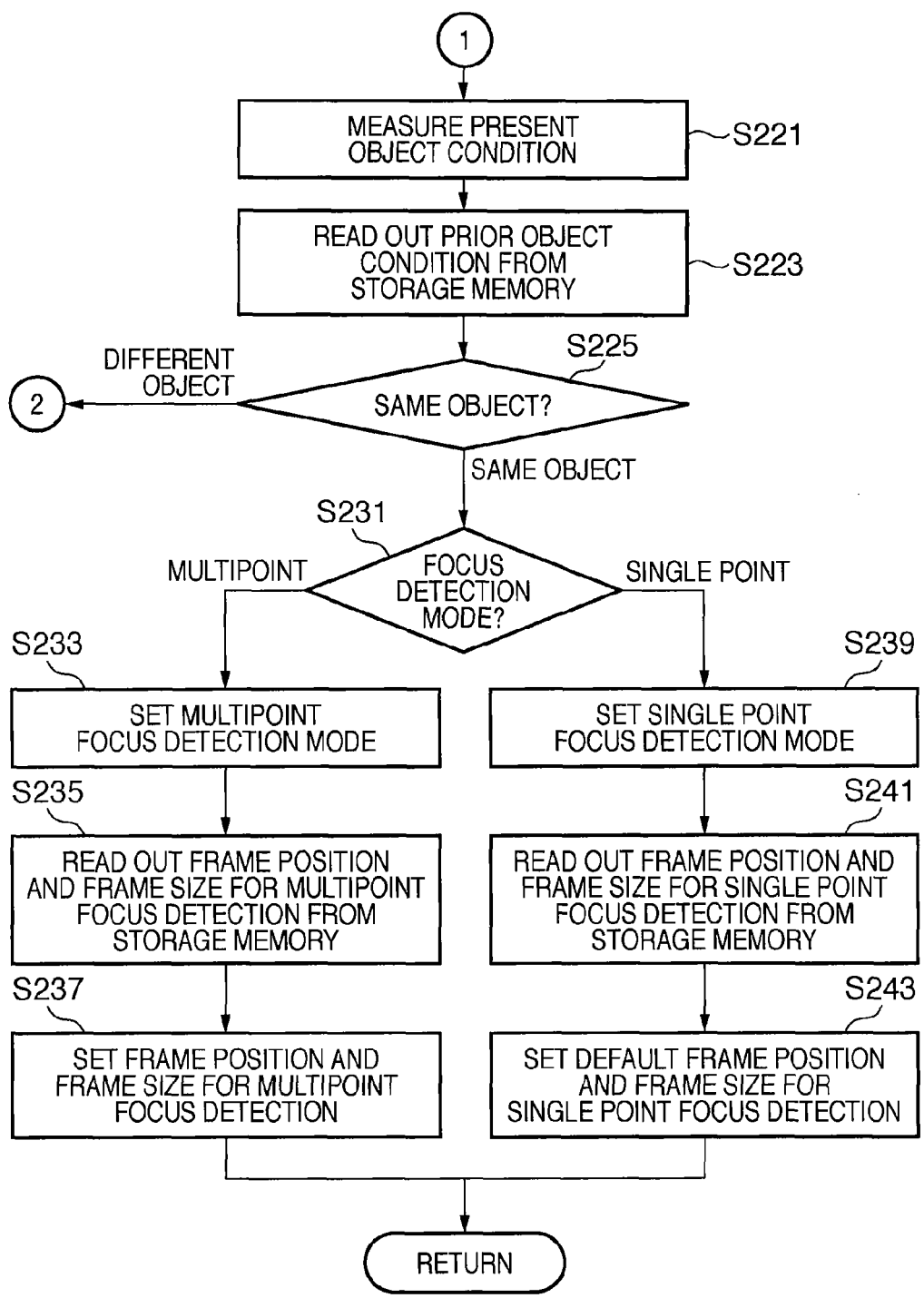

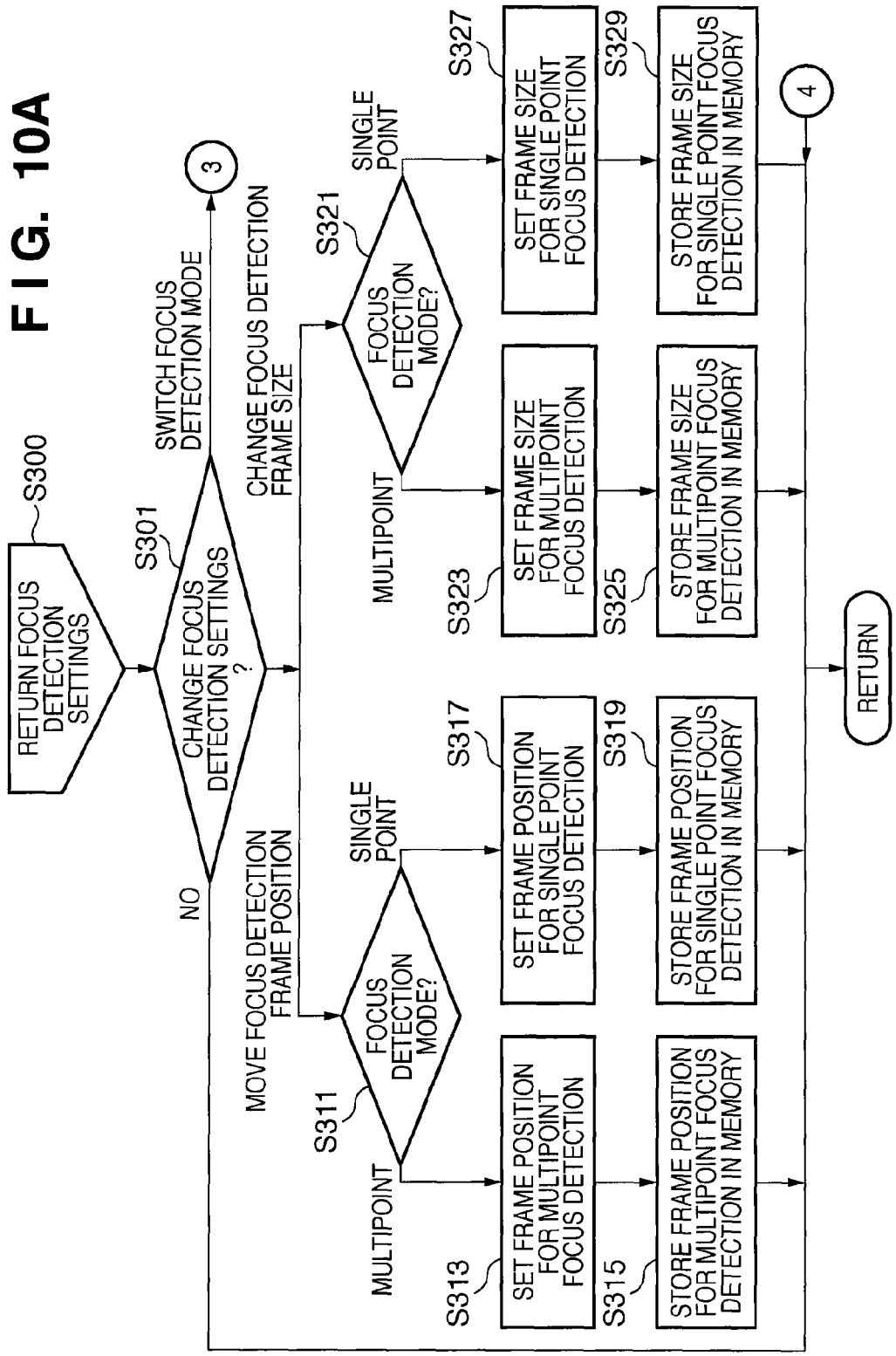

F I G. 16
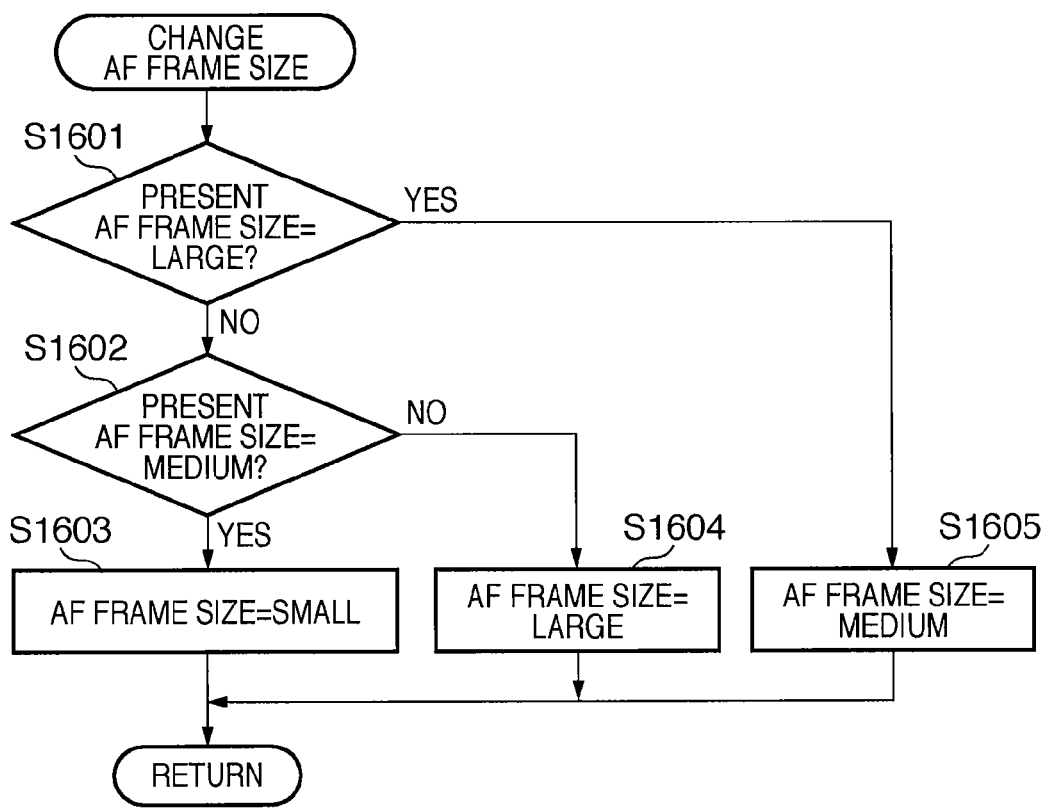

F I G. 21
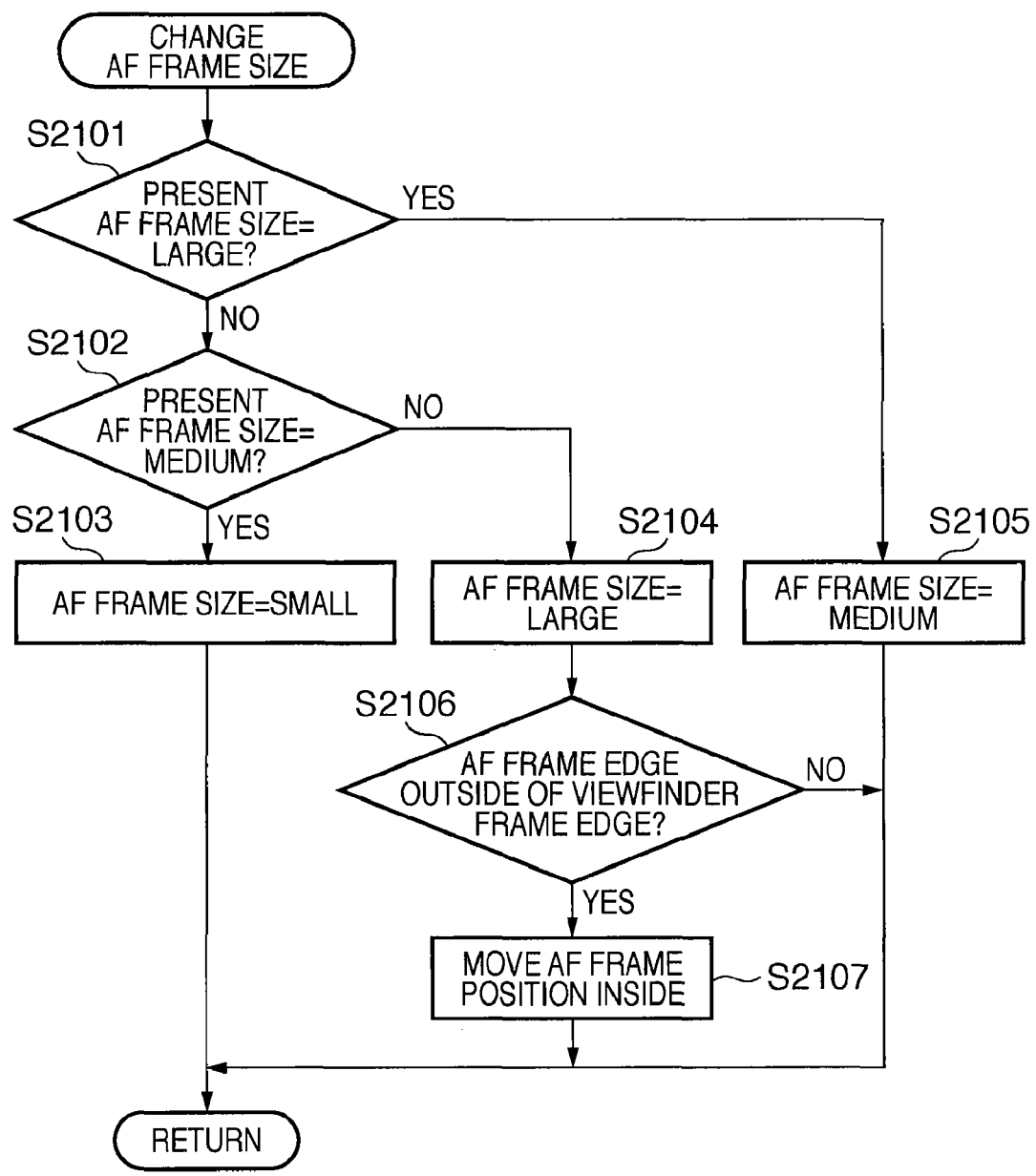

IMAGE CAPTURING APPARATUS AND METHOD FOR CONTROLLING SAME

CROSS-REFERENCE TO RELATED APPLICATION

This application is a continuation of application Ser. No. 12/172,308, filed Jul. 14, 2008, now U.S. Pat. No. 7,809,260 the entire disclosure of which is hereby incorporated by reference.

BACKGROUND OF THE INVENTION

1. Field of the Invention

The present invention relates to autofocus technology in image capturing apparatuses.

2. Description of the Related Art

Digital still cameras and digital video cameras are examples of image capturing apparatuses that employ an image sensor capable of photo-electric conversion such as a CCD or CMOS sensor. In these cameras, system simplification, reduced cost, and reduced size are realized by using an image sensor used to capture a still image or a moving image as a focus detection sensor, without having a separate sensor for focus detection.

In the case of a configuration in which an image sensor for capturing is used as a focus detection sensor, ordinarily a television AF system is adopted in which a lens position that is in focus is searched for from a frequency component of data that is read out from the image sensor. In this system, an image processing circuit is used to extract the frequency component from the image data read out from the image sensor, and the region extracted can be set as desired depending on the specifications of the image processing circuit.

When capturing a still image or a moving image with a camera, it is assumed that the photographer will capture the image by operating the camera such that a main object is in the center of the frame. Ordinarily, in the AF operation, the frequency component extraction region as well as the focus detection region are set such that focus detection is performed near the center of the frame. However, a case is also conceivable in which the capturing intent of the photographer is not limited to arranging the main object in the center of the frame, but rather the photographer intends to capture an image with the main object arranged at the edge of the frame. In order to respond to such needs, a camera has been proposed that has a focus detection mode in which the focus detection region is fixed in the center of the frame, and a mode in which it is possible to move the focus detection region to a desired position (see Japanese Patent Laid-Open No. H7-283994).

Also, a user interface has been proposed in which, in a camera provided with a plurality of focus detection modes as in Japanese Patent Laid-Open No. H7-283994, it is possible to simply switch the focus detection mode and select the focus detection region (see Japanese Patent Laid-Open No. 2006-39203). Conventionally, there have been cameras provided with a focus detection mode in which the focus detection region is fixed near the center, and a focus detection mode in which the focus detection region is arranged at a desired position. On the other hand, in order to respond to a wider range of user needs, cameras are desired that are provided with a plurality of focus detection modes in which the focus detection region can be arranged at a desired position. However in this case, it has been assumed that issues will arise with respect to storing position information and size information of the focus detection region selected by the user.

For example, assume that in a focus detection mode A, capturing is performed after arranging the position of the focus detection region at the left edge of the frame such that the focus detection position becomes optimal for a particular image capturing condition. Next, assume that in a focus detection mode B, capturing is desired after arranging the position of the focus detection region at the right edge of the frame such that the focus detection position becomes optimal for another image capturing condition. At this time, the position of the focus detection region designated in the focus detection mode A is also reflected in the focus detection mode B, and thus optimal focus detection region information for differing image capturing conditions is not generated, which is disadvantageous for the user.

Also, when a plurality of AF frames have been set, the display becomes confusing if all of the AF frames are always displayed in the viewfinder frame, so that it also becomes difficult to confirm the object in the viewfinder frame. It becomes more difficult to see the object as the number of AF frames increases. However, the position of a focus adjustment region cannot be confirmed if the AF frames are not displayed.

SUMMARY OF THE INVENTION

The present invention was made in consideration of the issues described above, and it is an object thereof to further improve operability related to setting the position and size of a focus detection region.

In order to address the above issues and attain this object, according to a first aspect of the invention, there is provided an image capturing apparatus comprising an image sensor that photo-electrically converts an object image formed by an optical lens, a focus detection unit that detects the focus state of the object image using an image signal from a focus detection region that is a region that is a portion within a frame of the image sensor, a setting unit that sets at least one of the size and the position of the focus detection region by, when adjusting at least one of the size and the position of a plurality of focus detection regions within the frame, changes the plurality of focus detection regions together as one group, and when adjusting at least one of the size and the position of one focus detection region within the frame, changes the one focus detection region, and a storage unit that stores at least one of the size or the position of the focus detection region separately for the case of the plurality of focus detection regions and the case of one focus detection region respectively, wherein the setting unit performs the setting in a setting mode, and the storage unit, when at least one of the size or the position is set by the setting unit and the setting mode ends, stores at least one of the size or the position of the focus detection region.

Also, according to a second aspect of the invention, there is provided a method for controlling an image capturing apparatus provided with an image sensor that photo-electrically converts an object image formed by an optical lens, the method comprising a focus detection step of detecting the focus state of the object image using an image signal from a focus detection region that is a region that is a portion within a frame of the image sensor, a setting step of setting at least one of the size and the position of the focus detection region by, when adjusting at least one of the size and the position of a plurality of focus detection regions within the frame, changing the plurality of focus detection regions together as one group, and when adjusting at least one of the size and the position of one focus detection region within the frame, changing the one focus detection region, and a storage step of storing, in the case of the plurality of focus detection regions and the case of one focus detection region respectively, at least one of the size and the position of the focus detection region, wherein in the setting step, the setting is performed in a setting mode, and in the storage step, when at least one of the size or the position is set by the setting step and the setting mode ends, at least one of the size and the position of the focus detection region is stored.

Further features of the present invention will become apparent from the following description of exemplary embodiments with reference to the attached drawings.

BRIEF DESCRIPTION OF THE DRAWINGS

FIGS. 9A and 9B are flowcharts that show focus detection setting return processing.

FIGS. 10A and 10B are flowcharts that show a focus detection setting change operation.

FIG. 16 is a flowchart that illustrates AF frame size change processing.

FIG. 21 is a flowchart that illustrates the AF frame size change processing in FIG. 14.

DESCRIPTION OF THE EMBODIMENTS

Below, preferred embodiments of the invention will be described in detail with reference to the appended drawings.

First Embodiment

Figure 1:
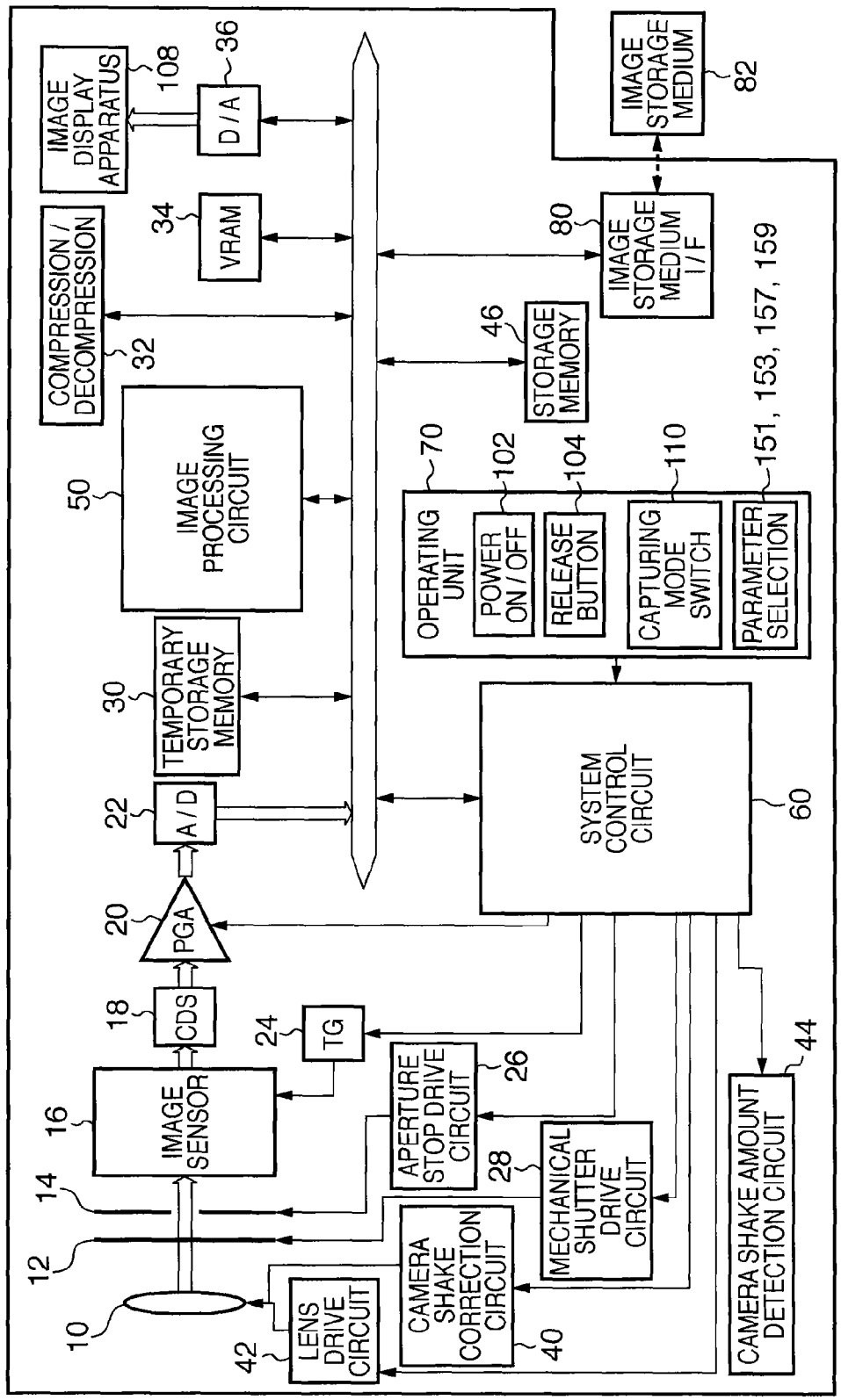
FIG. 1 is a block diagram that shows the configuration of an image capturing apparatus according to a first embodiment of the invention.

FIG. 1 is a block diagram that shows the configuration of an image capturing apparatus (digital camera) according to a first embodiment of the invention.

In FIG. 1, reference numeral 10 indicates a lens, and this lens 10 collects external light. In FIG. 1, the lens 10 is expressed as one lens, but the image capturing apparatus also can be provided with a lens unit configured from a plurality of lenses. Also, by moving the position of the lens front-to-back along an optical axis with a lens drive circuit 42, focus (in-focus state) can be adjusted, and the angle of view also can be adjusted. Furthermore, it is possible to adopt a configuration in which, based on the amount of camera shake detected with a camera shake amount detection circuit 44, it is possible to perform optical camera shake correction by driving the lens with a camera shake correction circuit 40 to change the optical axis in a direction that cancels the camera shake. The camera shake amount detection circuit 44 includes a gyro-sensor. In FIG. 1, camera shake correction is realized by driving the lens, but it is also possible to correct camera shake in the same manner by driving an image sensor 16 (in this embodiment, a CCD). It is also possible to adopt a system in which a lens barrel unit that includes the lens is extended and retracted within the body of the camera, thus providing portability by reducing the volume of the body when the camera is not being used (when the lens is stored).

The amount of light that passes through the lens is adjusted with an aperture stop 14. A system control circuit 60 controls the aperture stop 14 by transmitting aperture stop control information to an aperture stop drive circuit 26. The transmission of control information from the system control circuit 60 to the aperture stop drive circuit 26 is performed with serial communications, pulse signals, or the like, and an appropriate means is adopted according to the specifications of the aperture stop drive circuit 26. The aperture stop 14 may be an iris aperture stop configured from a plurality of blades, or a round aperture stop in which a plate is perforated in advance with holes of various diameters. The system control circuit 60 uses the aperture stop 14 and the aperture stop drive circuit 26 to perform control such that when the object brightness is high, the aperture stop is stopped down to reduce the amount of light, and when the object brightness is low, the aperture stop is opened to take in much light.

The system control circuit 60 controls a mechanical shutter 12 by transmitting mechanical shutter control information to a mechanical shutter drive circuit 28. The light exposure time when capturing a still image is determined by the opening/closing time of the mechanical shutter 12, and this time is judged by the system control circuit 60, which then instructs the mechanical shutter drive circuit 28.

Light that has passed through the lens 10, the mechanical shutter 12, and the aperture stop 14 is received by the image sensor 16, and photo-electrically converted. The system control circuit 60 controls the image sensor 16 by transmitting an image sensor control signal to a TG (Timing Generator) 24. The transmission of control information from the system control circuit 60 to the TG 24 is performed with serial communications, parallel bus communications, or the like, and an appropriate means is adopted according to the specifications of the TG 24. The TG 24 drives the image sensor 16 based on the control information received from the system control circuit 60. The image sensor 16 periodically performs work of exposing light to the sensor and reading out the data obtained by light exposure, and this work is performed based on drive signals from the TG 24. Among the signals obtained by light exposure with the image sensor 16, it is possible to read out only signals of a designated line or a designated region. This can be realized by changing the manner of read-out with a read-out control pulse that is output from the TG 24. The system control circuit 60 determines an optimal read-out method according to conditions and instructs the TG 24 to use this method. For example, different read-out methods are used according to conditions, such that when capturing still images, all data of the image sensor 16 is read out, and when using an electronic finder or when capturing a moving image, only designated lines are read out by decimation. This is because when capturing a still image, high resolution is demanded, and when capturing a moving image, a high frame rate is demanded, such as 30 fields per second or 60 fields per second.

Also, the TG 24 is capable of controlling the exposure time of the image sensor 16. This is made possible by outputting a drive signal from the TG 24 to the image sensor 16 at a desired timing, such that an electrical charge charged by the sensor is released.

An image signal that has been read out from the image sensor 16 passes through a CDS (Correlated Double Sampler) circuit 18. The CDS circuit 18 mainly serves a role of eliminating a noise component of the image data using a correlated double sampling method. Afterward, the signal level of the image signal is attenuated/amplified by a PGA (Programmable Gain Amplifier) circuit 20. The system control circuit 60 controls the amount of amplification by transmitting an amplification level to the PGA circuit 20. The transmission of control information from the system control circuit 60 to the PGA circuit 20 is performed with serial communications, parallel bus communications, or the like, and an appropriate means is adopted according to the specifications of the PGA circuit 20. Ordinarily, proper exposure of the image sensor 16 is realized by appropriately setting the amount of light exposed to the image sensor 16 with the aperture stop 14, and appropriately setting the exposure time with the shutter. However, by attenuating/amplifying the image signal with the PGA circuit 20, it is possible to fulfill a role of virtually changing the exposure of the image signal. This can provide a function to the user under the concept of sensitivity, as one exposure condition when capturing that is comparable to both the aperture stop and the shutter speed.

The image signal is converted from an analog signal to a digital signal with an A/D (Analog/Digital) converter 22. Depending on the device, the bit width of the digital signal may be 10 bits, 12 bits, 14 bits, or the like, and an image processing circuit 50 described later is configured to be compatible with a plurality of types of bit width. In FIG. 1, the CDS circuit, the PGA circuit, and the A/D converter circuit are respectively expressed as separate blocks, but it is also possible to adopt a configuration in which these functions are provided in one IC package.

The image data digitized by the A/D converter 22 is input to the image processing circuit 50. The image processing circuit 50 is configured from a plurality of blocks, and realizes various functions.

The image sensor 16 ordinarily extracts a designated color component for each pixel through a color filter. The image signal from the A/D converter 22 is in a data format compatible with the pixel and color filter arrangement of the image sensor 16. Thus, this format is not suitable for use with auto exposure control (AE) in which exposure control is performed by evaluating only the brightness component. The image processing circuit 50 is provided with a function to extract only brightness information from the image signal, excluding color information.

Furthermore, the image processing circuit 50 is provided with a function to extract only the frequency component of the signal read out from the image sensor 16, and thus can be used when performing auto focus (AF) control. A function is provided to set whether to extract the frequency component of some region of the data read out from the image sensor 16, or to divide the region. When this AF processing is performed, it is possible to drive the image sensor 16 appropriately for focus detection. In the case of television AF using an image sensor, it is necessary to drive a focus lens in synchronization with the drive rate (frame rate) of the image sensor, so it is possible to drive the focus lens faster as the drive rate of the image sensor increases. Thus, the image sensor 16 is driven such that the drive rate is fast only during AF. Conversely, by slowing the frame rate, and reading out more pixel data from the image sensor, frequency analysis of more data is possible with the image processing circuit 50, and thus more accurate focus detection becomes possible. It is preferable that this sort of usage of the image sensor is appropriately determined according to the capturing mode of the camera and the brightness of the object.

Furthermore, the image processing circuit 50 is provided with a function to operate amplification/attenuation of the image signal that has been digitized by the A/D converter 22, color effects of the image, and the like, and thus also serves a role of controlling image quality of the captured image.

At the same time that the image data that has been digitized by the A/D converter 22 is input to the image processing circuit 50, that image data is temporarily stored in a temporary storage memory 30. The image data that has been temporarily stored in the temporary storage memory can be again read out, so that the system control circuit 60 can refer to the image data, and the read-out image data can be input to the image processing circuit 50. Furthermore, the image data on which image processing has been performed with the image processing circuit 50 can be written back to the temporary storage memory, or desired data from the system control circuit 60 can be written into the memory.

When outputting to an image display apparatus 108 composed of an LCD or the like, the image data on which image processing has been performed with the image processing circuit 50 can be loaded in a VRAM 34, then converted to an analog signal with a D/A converter 36 and displayed on the image display apparatus 108. When realizing an electronic finder, continuous images read out from the image sensor 16 are displayed in sequence in an updated manner on the image display apparatus 108. Here, it is possible to adopt a configuration such that only one frame or a plurality of frames of the image in the VRAM 34 are not updated. This means is used in order to not output deteriorated image quality while driving the aperture stop to the image display apparatus 108. When loading the image data in the VRAM 34, it is possible to load the image data in the VRAM 34 in a manner that is compatible with various forms of display, for example loading the image data such that one unit of image data becomes as large as possible in the image display apparatus 108, or such that a plurality of images are displayed on multiple screens.

In the image display apparatus 108, it is possible to display not only an image, but also desired information alone or along with the image. It is possible to display the camera state, character information such as a shutter speed and aperture stop value, and sensitivity information selected by the user or determined by the camera, as well as a graph such as the brightness distribution measured with the image processing circuit 50. The display position and display color of the information can also be selected as desired. By displaying these various pieces of information, it is possible to realize a user interface. Also, in the image display apparatus 108, it is possible to display image data that is stored to an image storage medium 82. In a case in which the image data is compressed, the image data is decompressed by a compression/decompression block 32 and loaded in the VRAM 34. This data is converted to an analog signal by a D/A converter 36 and then output.

Reference numeral 70 indicates a camera operating unit, the details of which will be described later.

Figure 2:
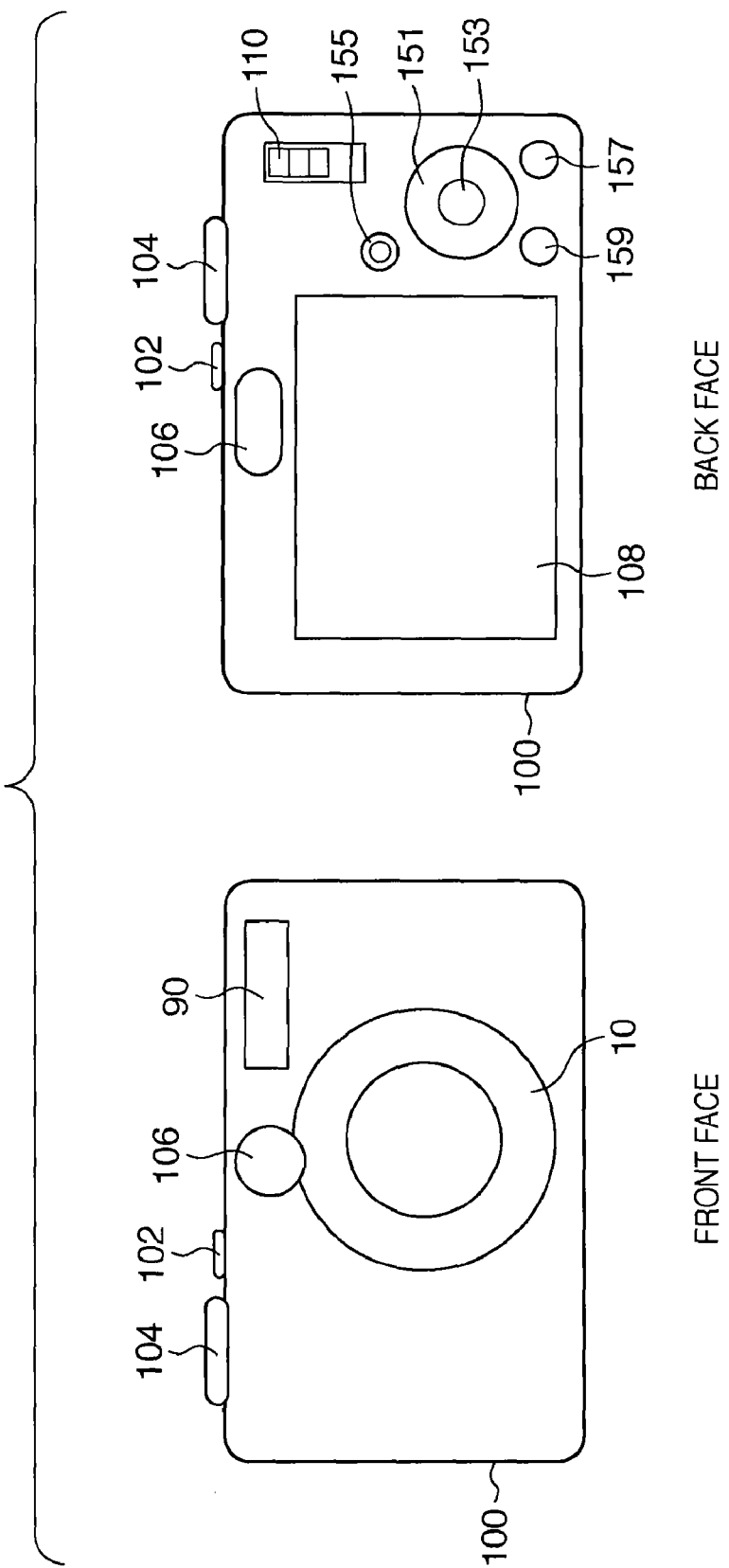
FIG. 2 shows an external view of the image capturing apparatus (a digital camera) of the first embodiment.

FIG. 2 shows an external view of the image capturing apparatus (a digital camera) 100 of the first embodiment. The lens 10 is disposed on the front face of the camera, and thus it is possible to form an object image on the image sensor 16. A strobe unit 90 is disposed on the same face as the lens 10. When the main object is dark, it is possible to obtain an adequate amount of light by causing the strobe unit 90 to emit light, and thus it is possible to obtain a good image by maintaining a high shutter speed even in a dark environment. In FIG. 2, the lens 10 and the strobe unit 90 are disposed on the same face, but this is not a limitation; it is also possible to dispose a strobe facing the top of the camera in order to avoid the strobe light directly hitting the main object.

The image display apparatus 108 is disposed on the back face of the camera. As described above, it is possible to display not only an image, but also character information, a graph, and the like on the image display apparatus 108, and thus the image display apparatus 108 is an important member used as a user interface. Recently, an electronic viewfinder (EVF) has become mainstream in digital cameras, and captures an object by referring to continuous images output to the image display apparatus 108, thus being used as a finder. At this time, photometric region information and focus detection region information in AE (automatic exposure control) or AF (autofocus) also can be displayed superimposed on the live image. It is also possible to adopt a configuration in which a conventional optical finder 106 is also provided. An electronic viewfinder has merits such as that a broad viewing angle is easily realized, the object is large and easily viewed depending on the size of the image display apparatus 108, and there is no difference in the angle of view (parallax) between the captured image and the finder image. On the other hand, electrical power is necessary in order to operate the image sensor 16 and the image display apparatus 108, so there is a danger of using up batteries. Thus, when it is desired to capture a large number of images while avoiding using up batteries, a usage pattern is also possible in which the electronic viewfinder function is turned off, and the optical finder 106 is used.

A capture mode switching switch 110 is capable of switching among camera operating modes such as a still image capture mode, a moving image capture mode, and a playback mode. In FIG. 2, the capture mode switching switch 110 is expressed as a member capable of switching among several modes, but it is also possible to provide many still image modes that are optimal for a particular scene to be captured, such as a scenery capturing mode or a person capturing mode.

With parameter selection switches 151, 153, 155, 157, and 159, it is possible for the user to select capturing conditions when capturing such as the focus detection region and light metering mode, page scrolling when playing back captured images, overall camera operation settings, and the like. Furthermore it is possible to select on/off for the aforementioned electronic finder. Also, the image display apparatus 108, along with displaying images, can be configured as a touch panel and thus be allowed to function as an input apparatus.

A release button 104 is disposed on top of the camera. The release button 104 is one operating member, and is capable of realizing a two-step depression operation that includes a case in which the button is depressed shallowly (SW1 operation) and a case in which the button is depressed deeply (SW2 operation). When automatic exposure control or automatic focus control is performed with the camera, by shallowly depressing the release button 104, automatic exposure control and focus control are performed as preparation for capturing, and by deeply depressing the release button 104, a still image capture operation is performed.

The automatic exposure control operates such that an appropriate exposure is obtained in the capture mode selected with the capture mode switching switch 110. The capture mode includes a portrait mode, scenery mode, and night scene mode, which are specialized modes for particular objects, and an auto mode, which is a general purpose mode. Also included are, for example, a shutter speed priority mode and an aperture stop priority mode; these are modes in which the user designates, in advance, the shutter speed and the aperture stop value when capturing. With these modes, it is possible to automatically appropriately set the capture sensitivity that is set with the PGA circuit 20, or possible for the user to designate, in advance, the sensitivity. When the user designates the sensitivity in advance, it is assumed that a user that wants to give priority to image quality will select a low sensitivity, because the signal-to-noise ratio of the image signal will decrease as the capture sensitivity is increased. Also, the AF control can switch operation such that appropriate focusing is possible in each capture mode. For example, in the scenery mode it is assumed that the main object is far away, so it is possible to detect focus only in the area of that main object.

Figure 3:
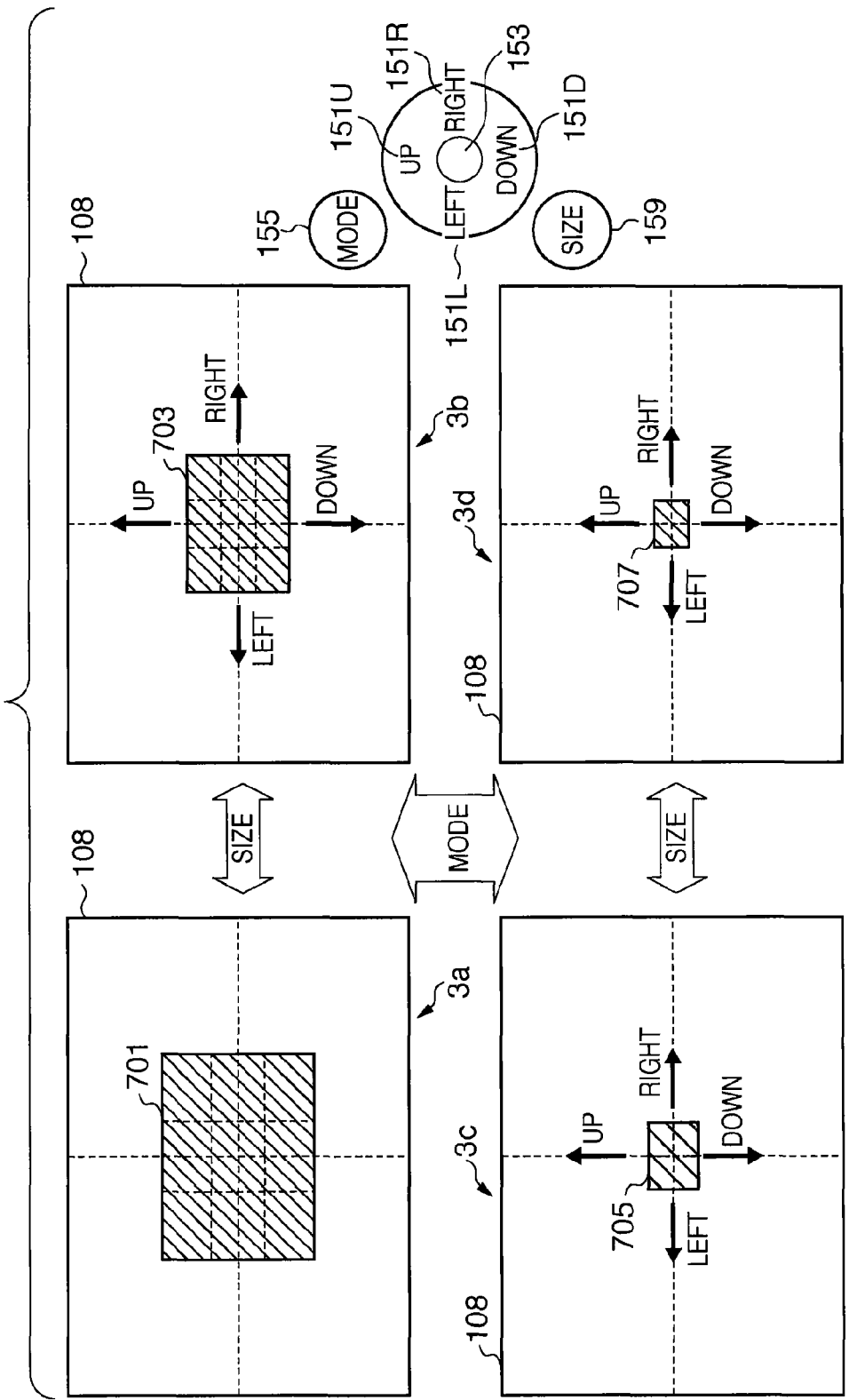
FIG. 3 shows how a focus detection region is selected using parameter selection switches.

FIG. 3 shows how the focus detection region is selected using the parameter selection switches 151, 155, and 159.

3a and 3b show focus detection region setting for a 9-point focus detection mode, and respectively show cases in which the size of the focus detection region differs. Likewise, 3c and 3d show focus detection region setting for a single point focus detection mode.

By depressing a focus detection mode switching button 155, it is possible to switch among the 9-point focus detection modes 3a and 3b, and the 1-point focus detection modes 3c and 3d. In FIG. 3, switching among two modes, the 9-point mode and the 1-point mode, is shown, but it is also possible to adopt a configuration in which a third and a fourth focus detection mode are provided, and it is possible to switch among these modes.

By depressing a focus detection region size change button 159 it is possible to switch among the large focus detection region size 3a and the small focus detection region size 3b, or 3c and 3d. In FIG. 3, it is possible to select two sizes, large or small, but it is also possible to adopt a configuration in which it is possible to designate various sizes.

Focus detection region position change buttons 151U, 151D, 151L, and 151R correspond to up, down, left, and right, and by depressing the respective buttons, it is possible to move focus detection regions 701, 703, 705, and 707 to a desired position within the angle of view. In FIG. 3, an operating member is adopted that can designate four directions, i.e. up, down, left, and right, but it is also possible to provide an operating member capable of expressing a diagonal direction or various other angles, thus further increasing operability. The size and position of the focus detection region designated using the parameter selection switches 151, 155, and 159 in this way are stored in an internal storage memory 46 for each focus detection mode. Note that in FIG. 3, a configuration is adopted in which in the case of the large focus detection region size 3a in the 9-point focus detection mode, it is possible to move the position, and in the case of the small focus detection region size 3b in the 9-point focus detection mode, it is not possible to move the position. On the other hand, in the 1-point focus detection mode, in the case of both the large focus detection region size 3c and the small focus detection region size 3d, it is possible to move the position regardless of the focus detection region size.

Figure 4:
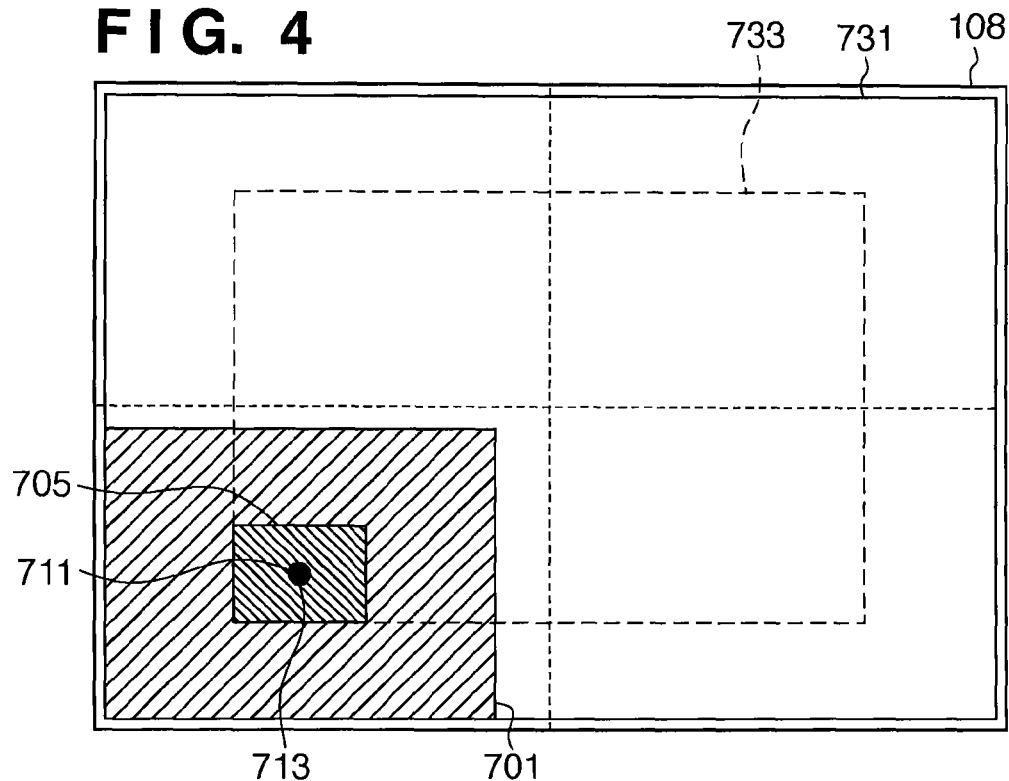
FIG. 4 shows a range in which the focus detection region can be moved.
Figure 5:
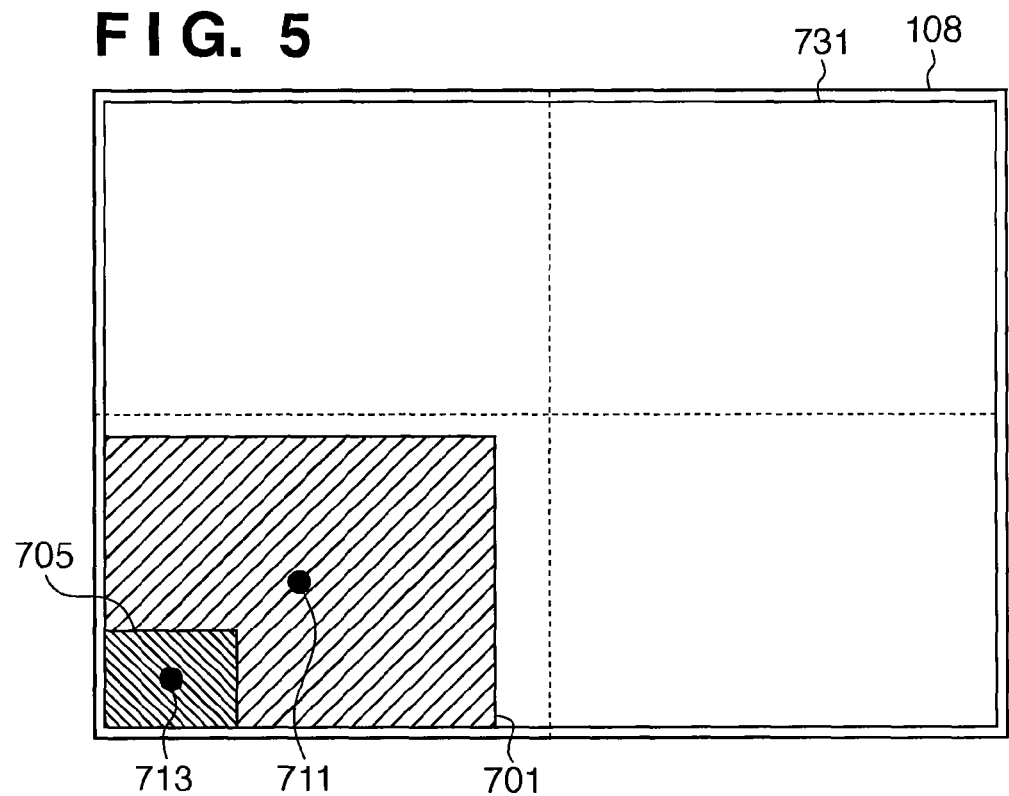
FIG. 5 shows a range in which the focus detection region can be moved.

FIGS. 4 and 5 show a range in which the focus detection region can be moved.

FIG. 4 shows a case in which, in a plurality of different focus detection modes, the movable range of a center coordinate of respective focus detection regions is limited. The movable region is the same for both a center coordinate 711 of the 9-point focus detection region 701 in the 9-point focus detection mode and a center coordinate 713 of the 1-point focus detection region 705 in the 1-point focus detection mode. Thus, the range in which the 9-point focus detection region 701 is movable is a region surrounded by a line 731, and the range in which the 1-point focus detection region 705 is movable is a region surrounded by a broken line 733.

FIG. 5 shows a case in which, in a plurality of different focus detection modes, the movable range is limited by an outer frame of respective focus detection regions. When the movable region is the same for both the outer frame of the 9-point focus detection region 701 and the outer frame of the 1-point focus detection region 705, the movable range of both outer frames becomes a region surrounded by the line 731.

As in FIGS. 4 and 5, the range in which the focus detection regions are moveable can be aligned by center coordinates, or can be aligned by the outer frame.

Figure 6:
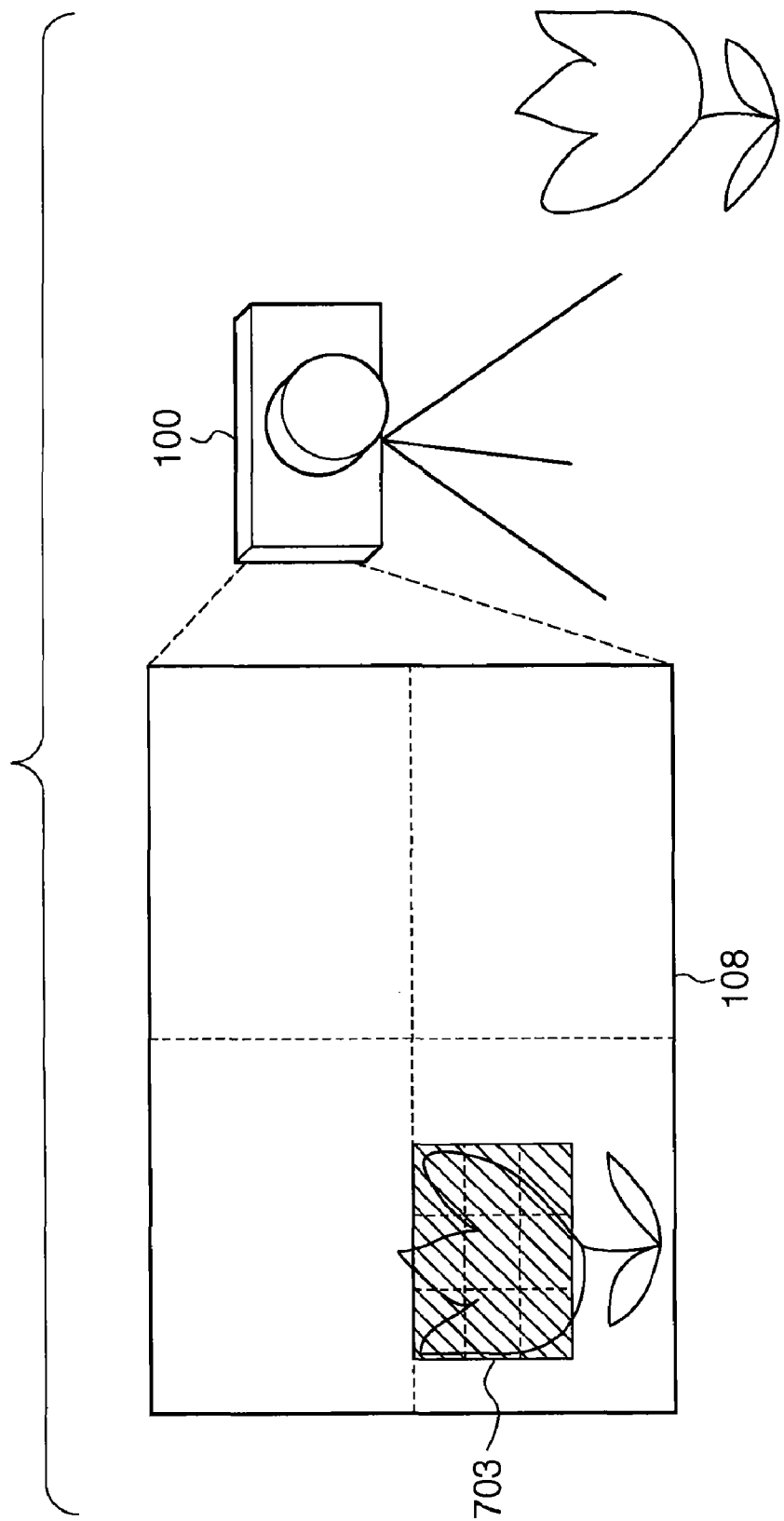
FIG. 6 shows how an image of a still plant is captured with a camera fixed to a tripod.

FIG. 6 shows how an image of a still plant is captured with a camera fixed to a tripod.

In FIG. 6, framing is performed such that a flower is deliberately offset from the center of the frame, according to the intent of the photographer. In a situation in which, as described above, it is desired to focus on the main object although the main object is not in the center of the frame, a function to move the focus detection region near the main object is effectively used. FIG. 6 shows a state in which the 9-point focus detection mode has been selected, the size of the focus detection region has been reduced, and the position of the focus detection region has been moved to the left of the frame.

By adopting a specification in which, when the camera is turned off after focus detection region settings that are suitable for a particular type of capturing condition, as described above, are set and capturing is performed, and then the camera is powered on the next time, the previous focus detection region settings are reset, the camera is easy to use in ordinary use. Thus, it is possible to adopt a specification in which the next time that the camera is powered on, the focus detection region is set to the center position. However, when the focus detection region and the object are set, and it is desired to capture by continuing with the same conditions after the camera is powered off and then powered on, this specification is not appropriate. So, it is possible to allow the camera to judge whether the camera is placed on a tripod or the like, and whether the object has changed, and possible to judge whether or not to return the focus detection region settings according to conditions. Whether or not the camera is installed on a tripod or the like (placement information) is judged from whether or not output from the camera shake detection circuit 44 used for camera shake correction is less than a predetermined value. Also, whether or not the object has changed (object information) is judged by measuring the brightness distribution and color temperature of the image based on the image data read out from the image sensor 16. The above placement information and the object information when performing capture is stored in the storage memory 46, and the storage memory 46 functions as a placement information storage unit and an object information storage unit.

Figure 7:
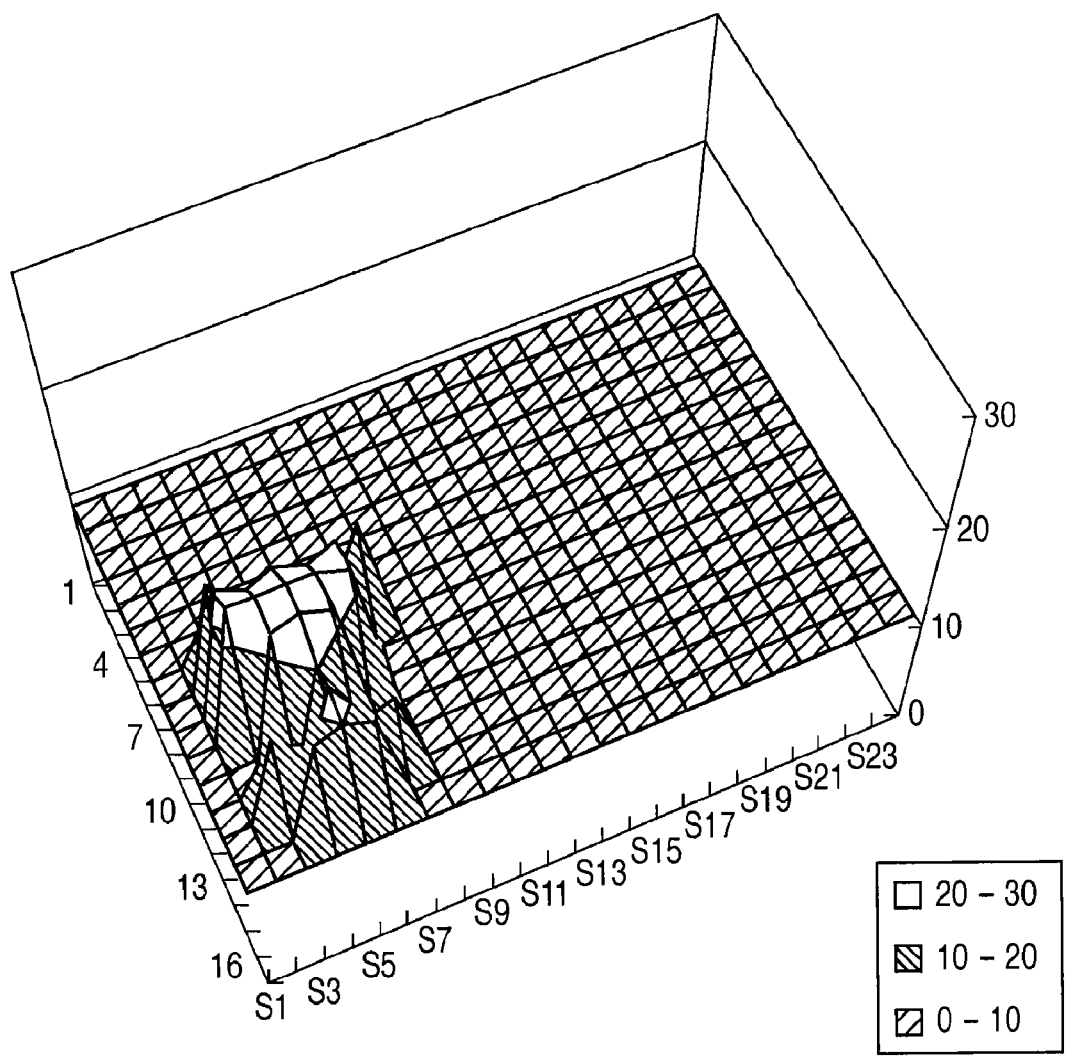
FIG. 7 shows the brightness distribution of an object.

In the case of camera setting as in FIG. 6, as shown in FIG. 7, the entire frame is divided into a plurality of blocks, distribution is measured for each block, and the measured distribution is stored as the condition of the object of the scene in which the flower was captured. The next time that the camera is started up, the distribution is likewise measured for each block, and by comparing to the previous distribution that has been stored, a judgment is made of whether the object and the position are the same.

When it is thought that the camera is fixed, and the object and position are the same, it is good to use the same focus detection region settings that were previously set.

Figure 8:
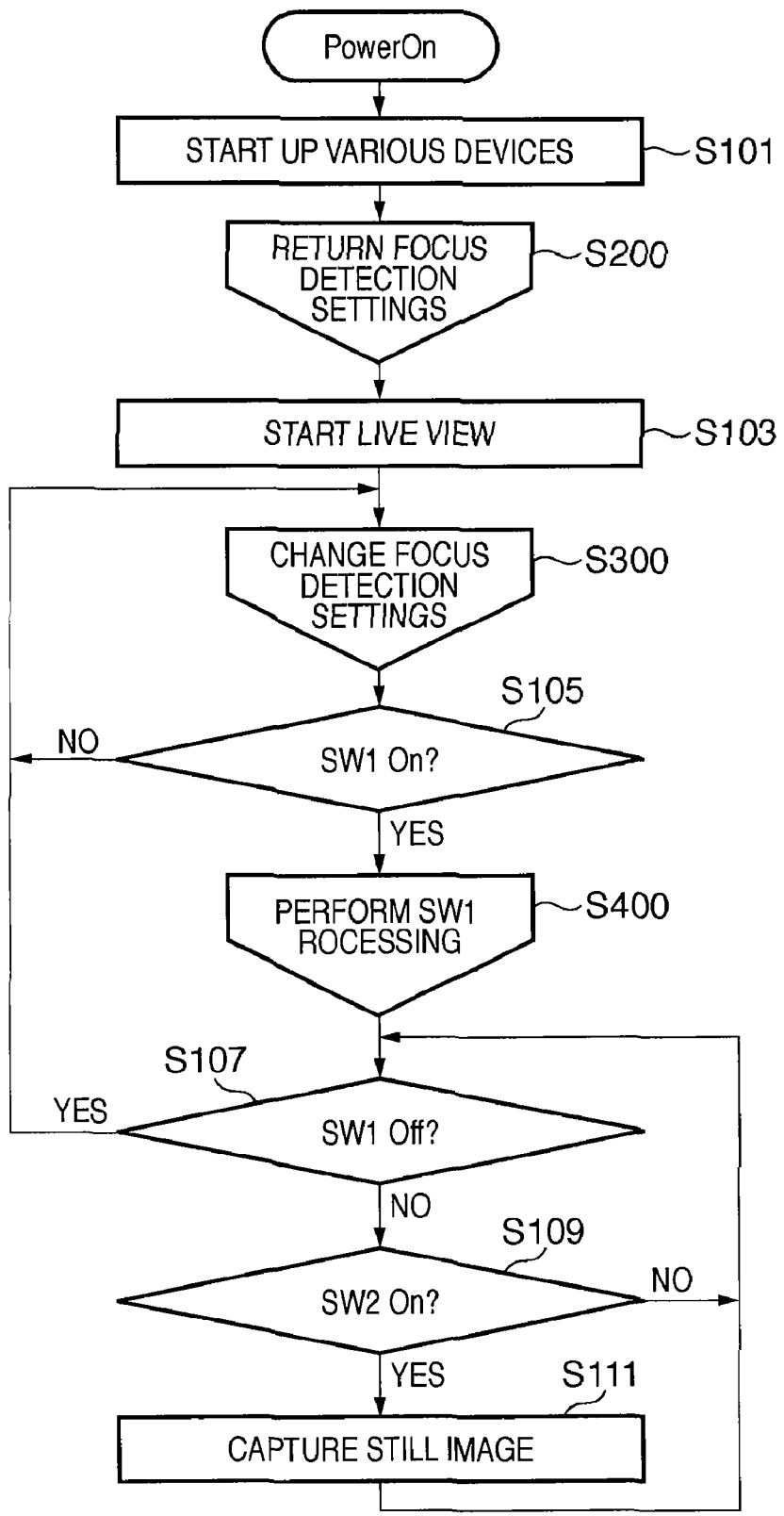
FIG. 8 shows a camera startup sequence.

FIG. 8 shows a camera startup sequence.

Depression of a power on/off button 102 is detected, and the camera begins startup. When starting up, the camera determines whether to start up in a capture mode or in the playback mode, depending on the state of the capture mode switching switch 110.

FIG. 8 shows the flow when starting up in a capture mode. Various devices are started up in order to establish a state in which a capture operation is possible in the capture mode (Step S101). In the case of a lens barrel in which the lens 10 can be extended or retracted, processing to extend the lens barrel is started, and the image sensor 16, the image processing circuit 50, and other various devices necessary for capture are started up. In the startup processing, focus detection settings return processing is performed (Step S200).

In the focus detection settings return processing shown in FIGS. 9A and 9B (Step S200), first the focus detection mode that was used in the previous instance of operation is read out from the storage memory 46 (Step S201). Next, the present camera shake amount is measured (Step S203), the camera shake amount during the prior operation is read out from the storage memory 46 (Step S205), and these are compared (Step S207). When the camera is fixed to a tripod or the like, it is expected that both the present and the prior amounts of camera shake will be no more than a prescribed value, and from such camera shake amount information, a judgment is made of whether or not the camera is fixed.

When it is judged here that there is camera shake, it is judged that the camera is not fixed to a tripod or the like, so the processing advances to Step S211, and a sequence is executed in which focus detection settings return processing is not performed. A judgment is made of whether the focus detection mode read out in Step S201 is the multipoint focus detection mode or the single point focus detection mode (Step S211), and focus detection region division settings are performed according to the respective modes (Steps S213, S217). Next, the position and size of the focus detection region is set, but because it has been judged that the camera is not fixed, the focus detection frame position is set to the center of the viewfinder frame, which is the default position for general purpose use (Steps S215, S219). In FIGS. 9A and 9B, a flow is shown in which when the camera is not fixed, the focus detection region settings are initialized, but it is also possible to adopt a specification in which both the size and position of the focus detection region continue from the prior setting, or a specification in which either the size or position setting continues.

When it has been judged in Step S207 that there is no camera shake, the present object condition is measured (Step S221), the object condition during the prior operation is read out from the storage memory 46 (Step S223), and both are compared (Step S225). The comparison performed here is a comparison of the object brightness distribution in the frame as shown in FIG. 7, and the color of the light source, and with a comparison of these, a judgment is made of whether or not there is a change in the condition of the object from the previous operation to the present. When judged that the object or the position is not the same, processing advances to Step S211, and a processing sequence is executed in which there is no continuation of the prior focus detection region settings.

When judged that the object and the position are the same, according to the focus detection mode in which reading out occurred in Step S201 (Step S231), the focus detection region settings stored for each respective mode are returned. After focus detection region division settings are performed according to the focus detection mode (Steps S233, S239), the focus detection region position and size information stored for each focus detection mode are read out from the storage memory 46 (Steps S235 and S241). Using the read out information, the focus detection region position and size are set (Step S237 and S243), and the processing to return the focus detection frame settings is completed.

Afterward, the image sensor 16 and the image display apparatus 108 are driven, thus shifting to a live view state in which the object image is monitored (Step S103). The user becomes able to frame the object that the user wishes to capture by referring to the live view, and can know which region AF will be performed in due to displaying the set focus detection region superimposed on the live view.

When the user, due to their capturing intent, wishes to change the focus detection mode, or the position or size of the focus detection region, the user performs that change by operating the operating members 151, 155, or 159 in this capture standby state (Step S300).

Figure 10B:
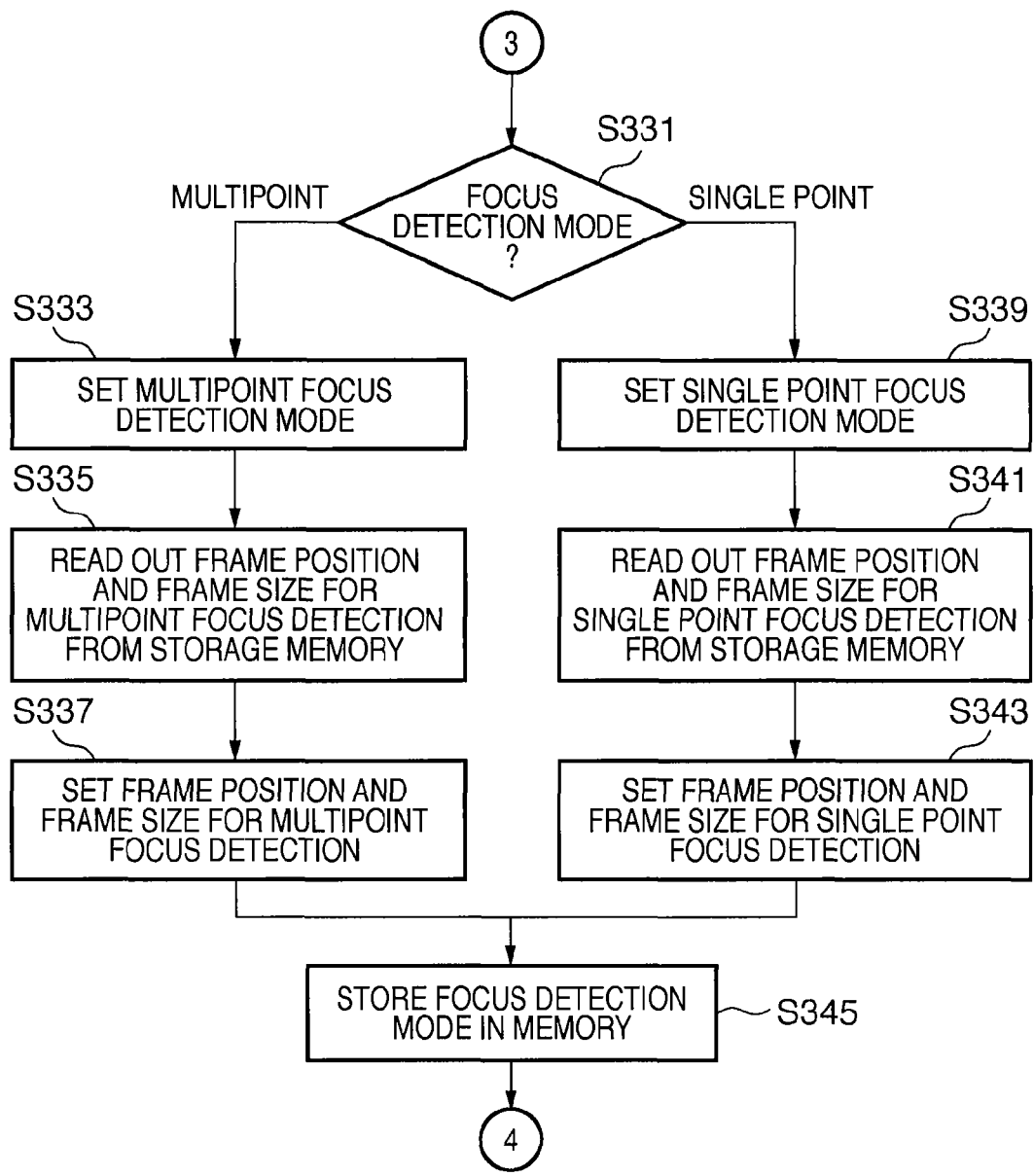

Here, the operation of changing focus detection settings performed in Step S300 is described with reference to the flowcharts in FIGS. 10A and 10B.

First, when judged that there is a focus detection mode change instruction (Step S301), next a judgment is made of which focus detection to change to (Step S331), and focus detection region division settings are performed according to the respective focus detection modes (Steps S333 and S339). Next, the focus detection region position and size information stored in the storage memory 46 for each focus detection mode is read out (Steps S335 and S341), and set (Steps S337 and S343). After setting is complete, the present focus detection mode information after switching is stored in the storage memory 46 (Step S345).

When judged in Step S301 that there is a focus detection frame position movement instruction, next a judgment is made of which focus detection is set (Step S311), and the focus detection region position setting is changed according to operation of the operating members (Steps S313 and S317). The focus detection region can be moved to a desired position within the frame, in the restricted range, as shown in FIGS. 3 and 4. After movement is completed, the focus detection region position at the movement destination is stored (Steps S315 and S319).

When judged in Step S301 that there is a focus detection frame size change instruction, next a judgment is made of which focus detection is set (Step S321), and the focus detection region size setting is changed according to operation of the operating members (Steps S323 and S327). The focus detection region size change operates by switching 3*a* and 3*b* in FIG. 3, or by switching 3*c* and 3*d*. After the size change, the changed size information is stored (Steps S325 and S329).

In this way, the user can change the focus detection region settings as desired in the standby state, and that settings information is stored in the camera.

A check is made of whether a release button (SW1) 104 has been depressed, which is an instruction to start capture preparation from the standby state (Step S105). If SW1 has not been depressed, a focus detection region settings change or the like can be received, but after SW1 is detected and capture preparation has begun, a focus detection region settings change or the like cannot be received. The reason is that when performing the AF operation after SW1 depression, focus detection region information that has already been selected is necessary. After detection of depression of SW1 in this manner, the SW1 sequence is executed (Step S400).

Figure 11:
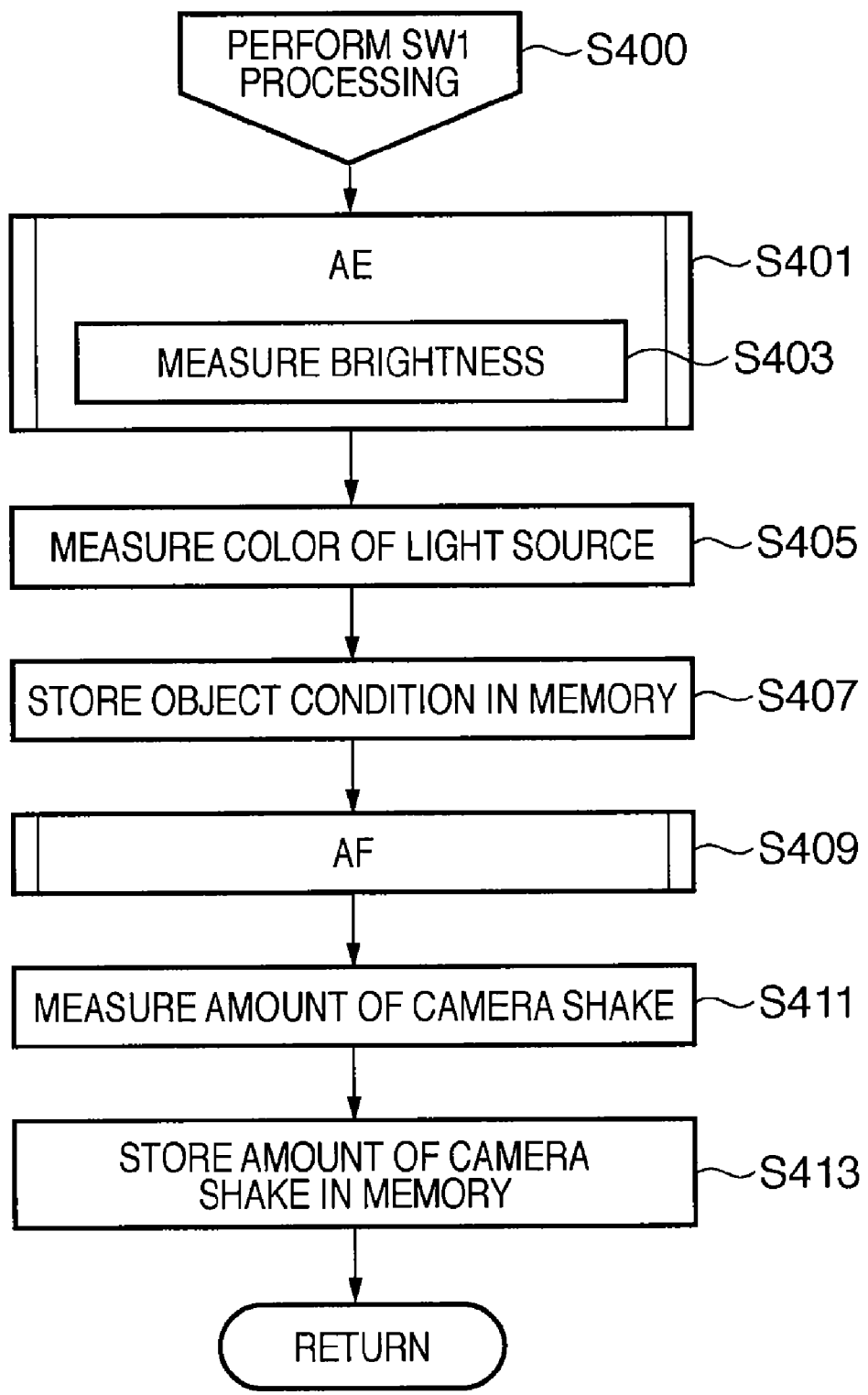
FIG. 11 is a flowchart that shows an operation after a release button (SW1) has been depressed.

Here, an operation performed after the release button (SW1) has been depressed in Step S400 will be described with reference to the flowchart in FIG. 11.

After SW1 is depressed, first, AE processing to perform capture with an appropriate brightness is performed (Step S401). In the AE procedure, the frame is divided into several blocks, the brightness of the object is measured in each block, and the brightness is appropriately evaluated for each block according to the condition of the object (Step S403). For example, in the case of a brightness distribution as shown in FIG. 7, it is possible to measure light with emphasis placed on a region where a body is thought to exist. Next, the color of the light source is measured, and information is gathered such that it is possible to know the condition of the object (Step S405). The object condition gathered in Step S401 and Step S405 is stored in the storage memory 46 (Step S407). The object condition information stored here is referred to in the startup sequence shown in FIG. 8. Here, a specification is adopted in which the object information is stored when SW1 is depressed, but a specification can also be adopted in which before SW1 is depressed, the object information is constantly gathered. However, due to a fear that power consumption will increase with processing for gathering the information, and a supposition that after SW1 is depressed, setting of the camera and the object is reliably completed, in FIG. 11 a specification is adopted in which after SW1 is depressed, the object information is gathered and stored.

After the AE processing, AF processing is performed (Step S409). In the AF processing, focus detection is performed using the focus detection settings information returned or initialized during startup in FIG. 9A, or the focus detection settings information changed in FIGS. 10A and 10B, thus controlling focus to an appropriate focus position. Next, the amount of camera shake is measured (Step S411), and camera shake amount information is stored in the storage memory 46 (Step S413). The object camera shake amount information stored here is referred to in the startup sequence shown in FIGS. 9A and 9B.

After SW1 processing is completed, a check is performed of whether SW1 is off (Step S107), or SW2 is depressed without an interruption (Step S109). When SW1 has been switched off, it is assumed that there is not intent to capture, and the capture standby state is returned to temporarily. When SW2 has been depressed, capturing is executed (Step S111). At this capturing time, AE and AF processing have already been performed due to depressing SW1, so optimal exposure setting and focus control have been performed.

FIGS. 12A to 12F show a sequence of transitioning from a capture mode to a state other than capture. Other than capture indicates power off or the playback mode. In FIGS. 12A to 12F, sequences of various patterns are shown, and this indicates a plurality of patterns of which focus detection region settings information will be cleared.

Figure 12A:
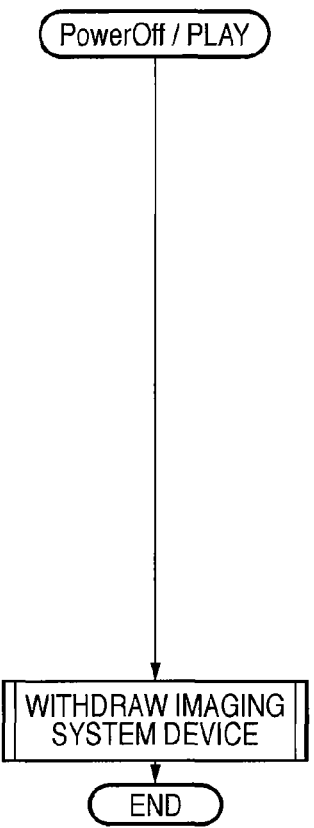
FIGS. 12A to 12F show a sequence of transitioning from a capture mode to a state other than capture.

FIG. 12A shows a sequence in which none of the focus detection region settings information is cleared. In this case, all of the focus detection region settings information remains stored, so it is possible to return those settings the next time that the camera is started up.

Figure 12B:
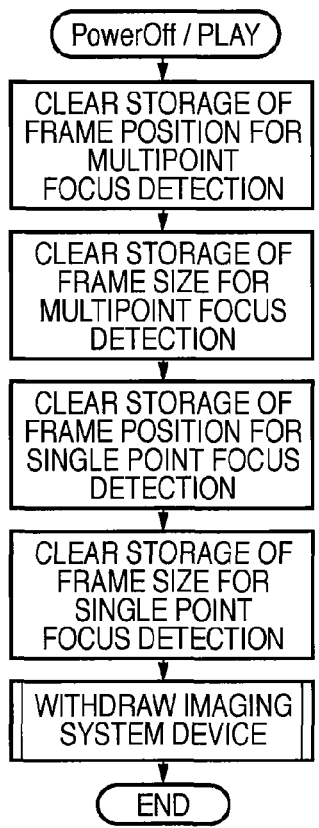

FIG. 12B shows a sequence in which the focus detection region information other than the focus detection mode is cleared. In this case, only the focus detection mode can be returned, and the position and size that were previously set by the user are not returned.

Figure 12C:
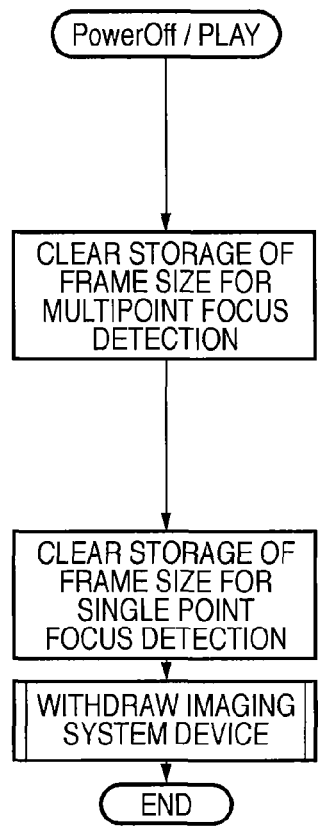
Figure 12D:
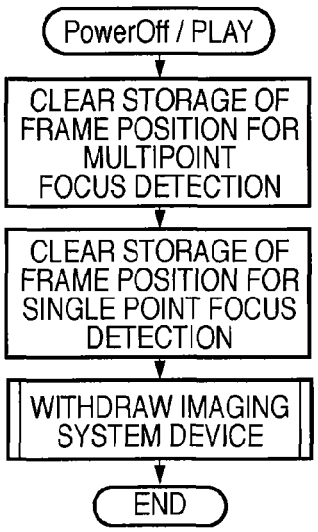
Figure 12E:
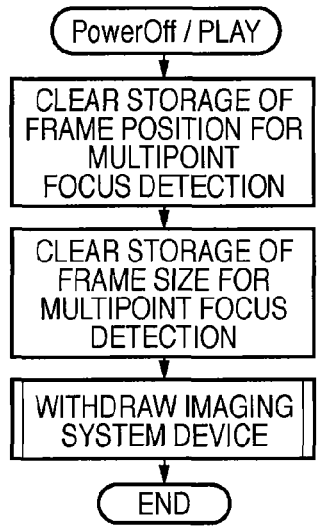
Figure 12F:
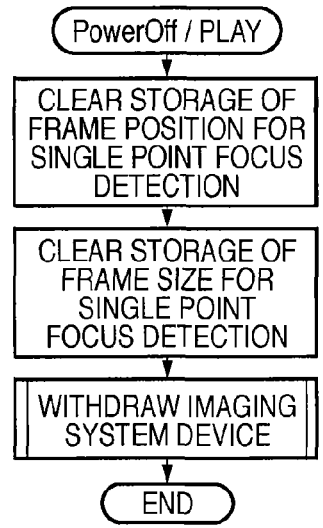

FIG. 12C shows a sequence in which only the focus detection region size for multipoint focus detection and single point focus detection are cleared. FIG. 12D shows a sequence in which only the focus detection region position for multipoint focus detection and single point focus detection are cleared. FIG. 12E shows a sequence in which the size and position for multipoint focus detection are cleared. FIG. 12F shows a sequence in which the size and position for single point focus detection are cleared.

Among various patterns such as these, any sequence may be adopted according to product specifications.

With an embodiment as described above, when a plurality of focus detection modes are provided in which it is possible to change the position and size of the focus detection region, it is possible for the focus detection position and size that have been set for the respective focus detection modes to be appropriately stored and returned, and thus to achieve an improvement in operability.

By making it possible to designate the focus detection region position and focus detection region size for each of a plurality of focus detection modes, and possible to store focus detection region information for each focus detection mode, it becomes easy to perform capture with settings appropriate to the object in each focus detection mode, and thus operability improves.

Also, by appropriately using focus detection region information that has been stored according to changes in camera state such as power off, shift to playback mode, or storage of the optical lens, or changes in the placement state of the camera or changes in the object, it is possible to use settings that take into account the capturing intent of the photographer.

Second Embodiment

Figure 13:
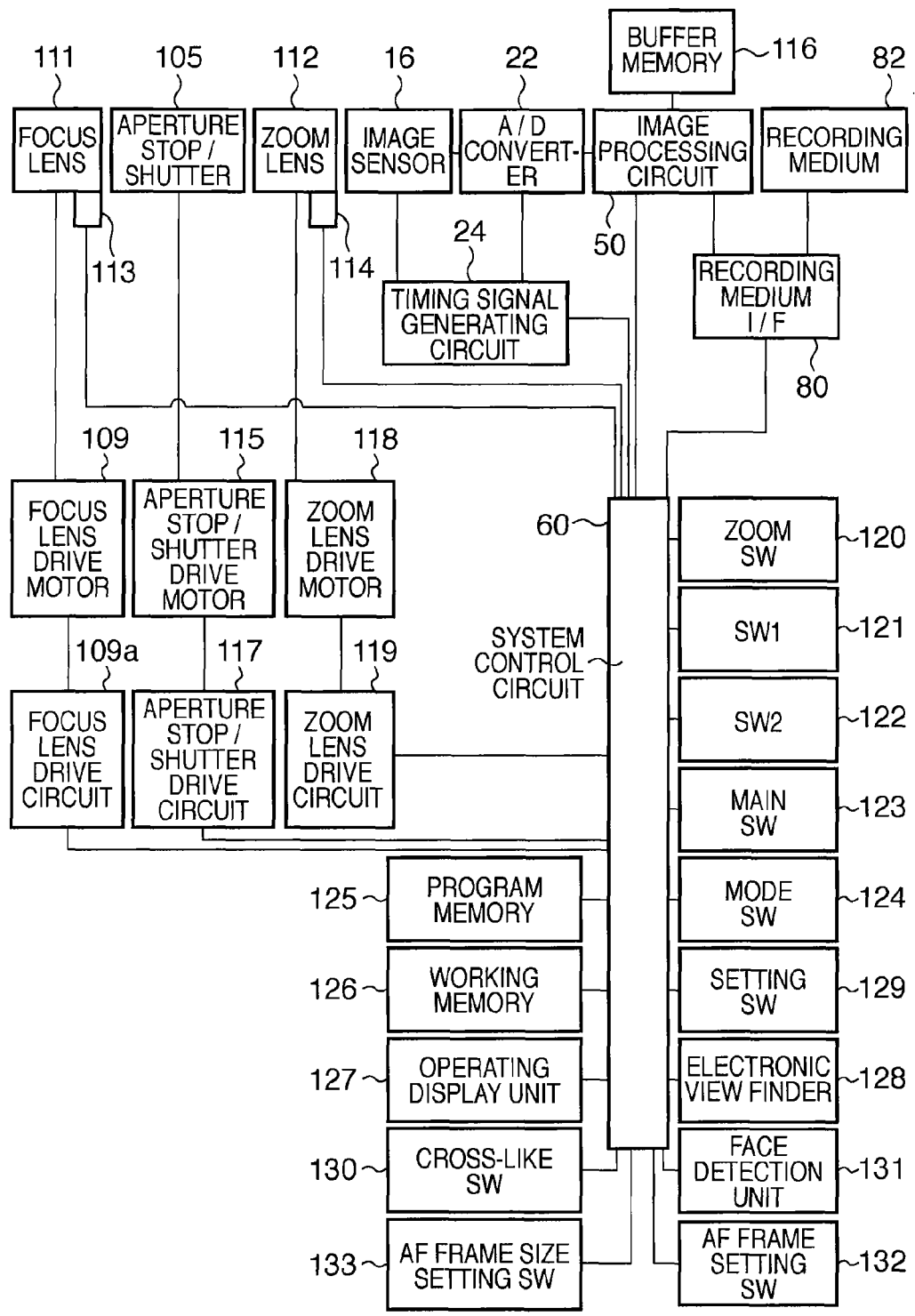
FIG. 13 is a block diagram that shows the overall configuration of a digital camera.

FIG. 13 is a block diagram that shows the overall configuration of a digital camera that is an example of an image capturing apparatus in a second embodiment of the invention.

Reference numeral 111 indicates a focus lens for focusing on the image sensor 16, described later, and reference numeral 113 is a photointerrupter that detects the initial position of the focus lens 111. Reference numeral 109 indicates a focus lens drive motor that drives the focus lens 111, and 109a indicates a focus lens drive circuit that inputs a drive signal to the focus lens drive motor 109 to move the focus lens 111.

Reference numeral 105 indicates a light amount control member such as an aperture stop and shutter (below, an "aperture stop/shutter", and 115 indicates an aperture stop/shutter drive motor that drives the aperture stop/shutter 105. Reference numeral 117 indicates an aperture stop/shutter drive circuit that inputs a drive signal to the aperture stop/shutter drive motor 115 to move the aperture stop/shutter 105.

Reference numeral 112 indicates a zoom lens that changes the focal distance of a capturing lens, and 114 indicates a photointerrupter that detects the initial position of the zoom lens 112. Reference numeral 118 indicates a zoom lens drive motor that drives the zoom lens 112, and 119 indicates a zoom lens drive circuit that inputs a drive signal to the zoom lens drive motor 118 to move the zoom lens 112.

Reference numeral 16 indicates an image sensor that converts light reflected from an object to an electrical signal, and 22 indicates an A/D converter that converts an analog signal output from the image sensor 16 to a digital signal. Reference numeral 24 indicates a timing signal generating circuit (TG) that generates timing signals necessary for operating the image sensor 16 and the A/D converter 22.

Reference numeral 50 indicates an image processing processor that performs predetermined processing on image data that has been input from the A/D converter 22, and 116 indicates a buffer memory that temporarily stores image data that has been processed with the image processing circuit 50. Reference numeral 80 indicates an interface for connecting to a recording medium 82, which is a recording medium such as a memory card or a hard disk.

Reference numeral 60 indicates a microcontroller which is a system control circuit (referred to below as a "CPU") for controlling the system as a whole.

Reference numeral 120 indicates a zoom switch (SW) that inputs signals to the CPU 60 that instruct to start and stop zoom operation. Reference numeral 121 indicates a switch (shown in FIG. 1 as "SW1") for instructing capture preparation such as AF and AE, and reference numeral 122 indicates a capture processing instruction switch (shown in FIG. 1 as "SW2") for instructing capture processing such as the main exposure and recording operations after operation of the capture preparation instruction switch 121. Reference numeral 123 indicates a main switch (SW) for turning on power to the system, and 124 indicates a mode switch (SW) that sets the operating mode of the camera.

Reference numeral 125 indicates a program memory in which programs executed by the CPU 60 are stored, and 126 indicates a working memory for temporarily storing various data necessary when the CPU 60 performs processing according to the programs stored in the program memory 125. Reference numeral 127 indicates an operating display unit that displays the operating state of the camera and various warnings, and 128 indicates an electronic viewfinder (EVF) that is a display apparatus that displays images, AF frames, and the like, with display content being controlled by the CPU 60. That is, the CPU 60 serves a role as a display control means. Reference numeral 129 indicates a setting switch (SW) that performs various settings. Reference numeral 130 indicates a cross-like switch used, for example, for selection of menu items displayed on the operating display unit 127 or the EVF 128, and instructing movement of the position of the focus detection frame (AF frame) that indicates a focus adjustment region, and 131 indicates a face detection unit that performs face detection from an image signal (image) obtained by image capturing. Reference numeral 132 indicates an AF frame setting switch (SW), which is a mode switching means for changing to an AF frame setting mode (first mode) in which the position and size of the AF frame is changed. Each time the AF frame setting switch 132 is depressed, shifting to the AF frame setting mode (first mode) and release from the AF frame setting mode (second mode) are alternately performed. Reference numeral 133 indicates an AF frame size change switch (SW) for changing the size of the AF frame. In this second embodiment, as shown in FIG. 5, nine (3×3) AF frames are present, and they are set adjacent to each other.

In this embodiment, in a digital camera having the above configuration, when SW1 is pressed by the photographer, the CPU 60 performs control of the AF processing operation based on a program stored in the program memory 125. That is, the CPU 60 functions as a focus adjustment means. Below is a simple description of the AF processing operation.

First, the focus lens 111 is moved to a scan start position. The scan start position, for example, is an infinite edge of a region where focusing is possible.

Next, an analog video signal that has been read out from the image sensor 16 is converted to a digital signal by the A/D converter 22. Then, the image processing circuit 50 is caused to extract the high frequency component of the brightness signal from that output for each AF frame, and this is stored in the working memory 126 as focus evaluation values.

Next, the present position of the focus lens 111 is acquired and stored in the working memory 126. When a stepping motor is used as the focus lens drive motor 109, the focus lens 111 can be positioned away from the initial position detected by the photointerrupter 113 by the number of relative drive pulses. Also, the absolute position may be measured using a rotary encoder or the like.

Afterward, a judgment is made of whether the present position of the focus lens 111 is the same as the scan end position, and if the same, a maximum focus evaluation value is calculated from among the acquired focus evaluation values. If not the same, the focus lens 111 is moved a predetermined amount in the direction that scan ends, an analog video signal is again read out from the image sensor 16 and focus evaluation values are acquired as described above.

The AF processing operation as described above is performed for all of the AF frames (nine frames in this embodiment), and an optimal focus position is obtained from within the AF frame for which a maximum value was obtained. For example, the AF frame that focuses on the frontmost object is selected and used as the focus position. By selecting this AF frame, it is possible to avoid so-called "center out-of-focus" in which in a scene where two people are standing apart from each other, the focus is adjusted to the background (between the people, or in the center), so that the two people are out of focus. In addition, by selecting an AF frame with the largest maximum value, selecting a middle value, or the like, selection of an AF frame for obtaining the focus position can be changed appropriately based on various conditions.

In this manner, based on a program that the CPU 60 has set in advance, an automatic judgment is made of the object of which AF frame among the plurality of AF frames focus control will actually be based on.

Figure 14:
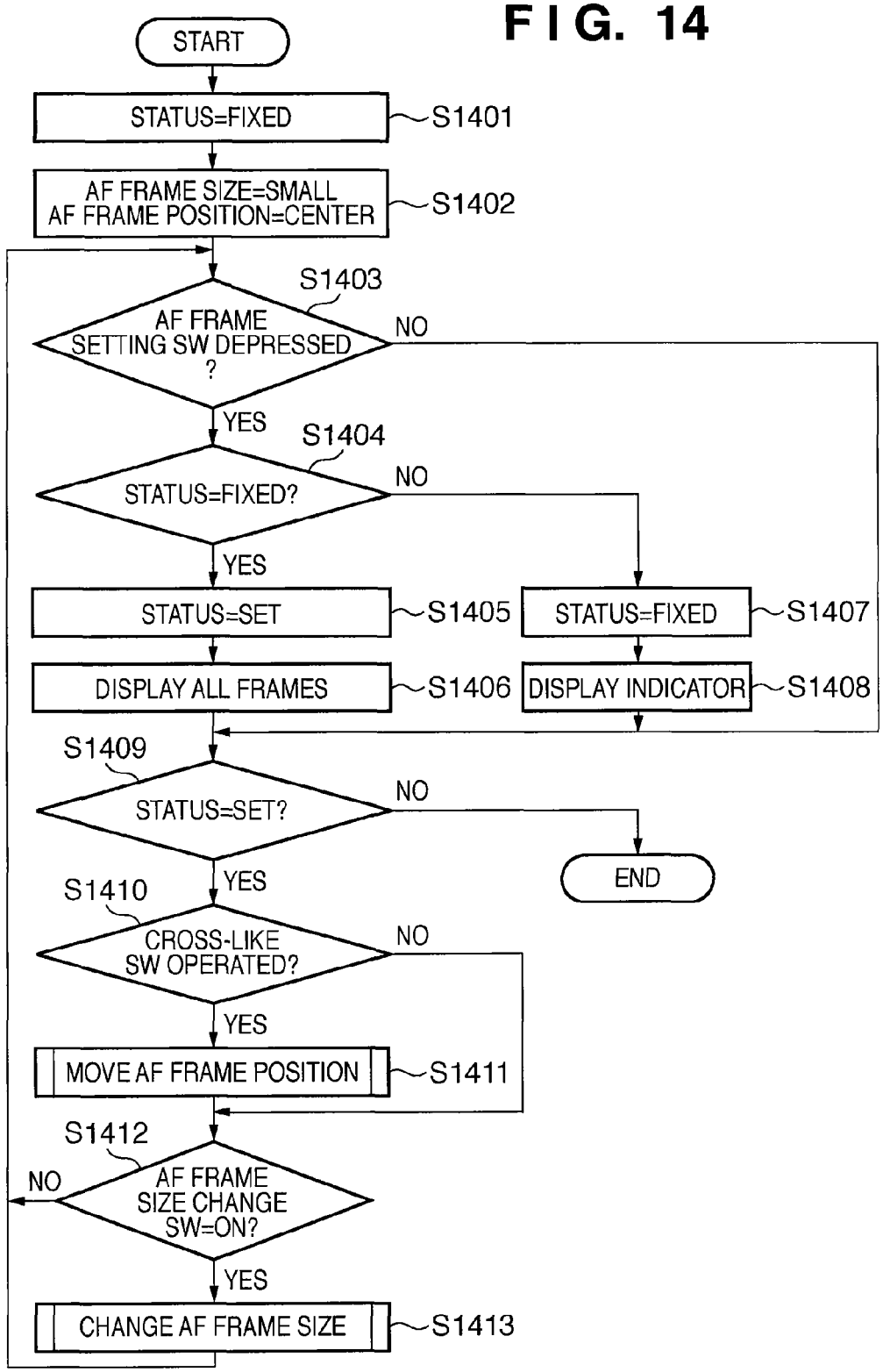
FIG. 14 is a flowchart for illustrating a procedure of changing the position and size of an AF frame.

Next is a description of a procedure for changing the AF frame state (position and size in this embodiment), with reference to the flowchart in FIG. 14.

First, in Step S1401, a variable STATUS that indicates the state of the AF frame setting mode (that is, whether or not in the AF frame setting mode) is set to "fixed". "Fixed" indicates not in the AF frame setting mode, i.e., a mode when the position and size of the AF frame is not changed (second mode). This STATUS is stored in the working memory 126. Next, in Step S1402 the AF frame size is set to "small" as the initial state, and the AF frame position is set to the center of the frame, and they are stored in the working memory 126. In this embodiment, the AF frame size can be set in three steps, "large", "medium", and "small", but of course a configuration may be adopted in which it is possible to set the AF frame size in other than three steps as desired.

In Step S1403, a judgment is made of whether or not the AF frame setting switch 132 has been depressed, and if depressed, processing advances to Step S1404, and if not depressed, processing advances to Step S1409.

Figure 17A:
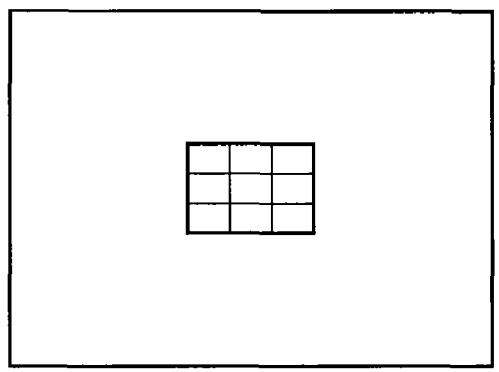
FIG. 17A illustrates the way that the AF frame is displayed in an AF frame setting mode.

In Step S1404, the state of the variable STATUS stored in the working memory 126 is checked; if "fixed" (i.e., not the AF frame setting mode), processing advances to Step S1405, and if not "fixed", processing advances to Step S1407. In Step S1405, STATUS is changed to "set", and stored in the working memory 1426. "Set" indicates the AF frame setting mode (first mode), and when STATUS is "set", it is possible to change the AF frame position and size. Next, in Step S1406, all of the plurality of AF frames are displayed on the EVF 128, superimposed on the image obtained by capturing. In the initial state (size "small", position in the center), a display as shown in FIG. 17A is performed. Here, a total of nine AF frames are shown, with three AF frames vertically and three horizontally.

Figure 17B:
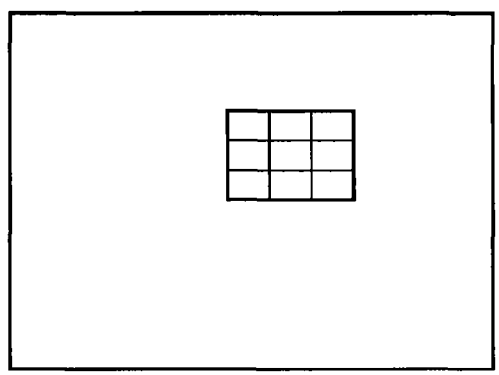
FIG. 17B shows an example display when the AF frame has been moved in the AF frame setting mode.

On the other hand, if STATUS is not "fixed", in Step S1407, STATUS is changed to "fixed" and stored to the working memory 126. In addition, as described in the first embodiment, the AF frame position and size information is stored. Next, in Step S1408, the display of the AF frame displayed on the EVF 128 is changed to display an indicator such that the overall position and size of the plurality of AF frames is understood. For example, when performing a display as shown in FIG. 17A, as shown in FIG. 17B, the display is changed to an abbreviated display as an indicator such that, using a total of nine AF frames as one group with three AF frames vertically and three horizontally, the overall position and size of that group is understood, and this display is superimposed on the obtained image.

In Step S1409, the state of STATUS stored in the working memory 126 is checked; if "set", processing advances to Step S1410 to shift to processing that changes the AF frame position and size, and if not "set", the present processing ends.

In Step S1410, the operating state of the cross switch 130 is checked; if operated, processing advances to Step S1411, and if not operated, processing advances to Step S1412. In Step S1411, the AF frame position is moved according to a procedure described later with reference to FIG. 15, and then processing advances to Step S1412.

In Step S1412, the operating state of the AF frame size change switch 133 is checked; if operated, processing advances to Step S1413, and if not operated, processing advances to Step S1403. In Step S1413, the AF frame size is changed according to a procedure described later with reference to FIG. 16, and then processing returns to Step S1403.

In this way, in a state in which STATUS is "set", the entire AF frame is displayed, and it is possible to change the AF frame position and size, and in a state in which STATUS is "fixed", a display is performed such that the AF frame size and position are understood without obstructing observation of the object.

Figure 15:
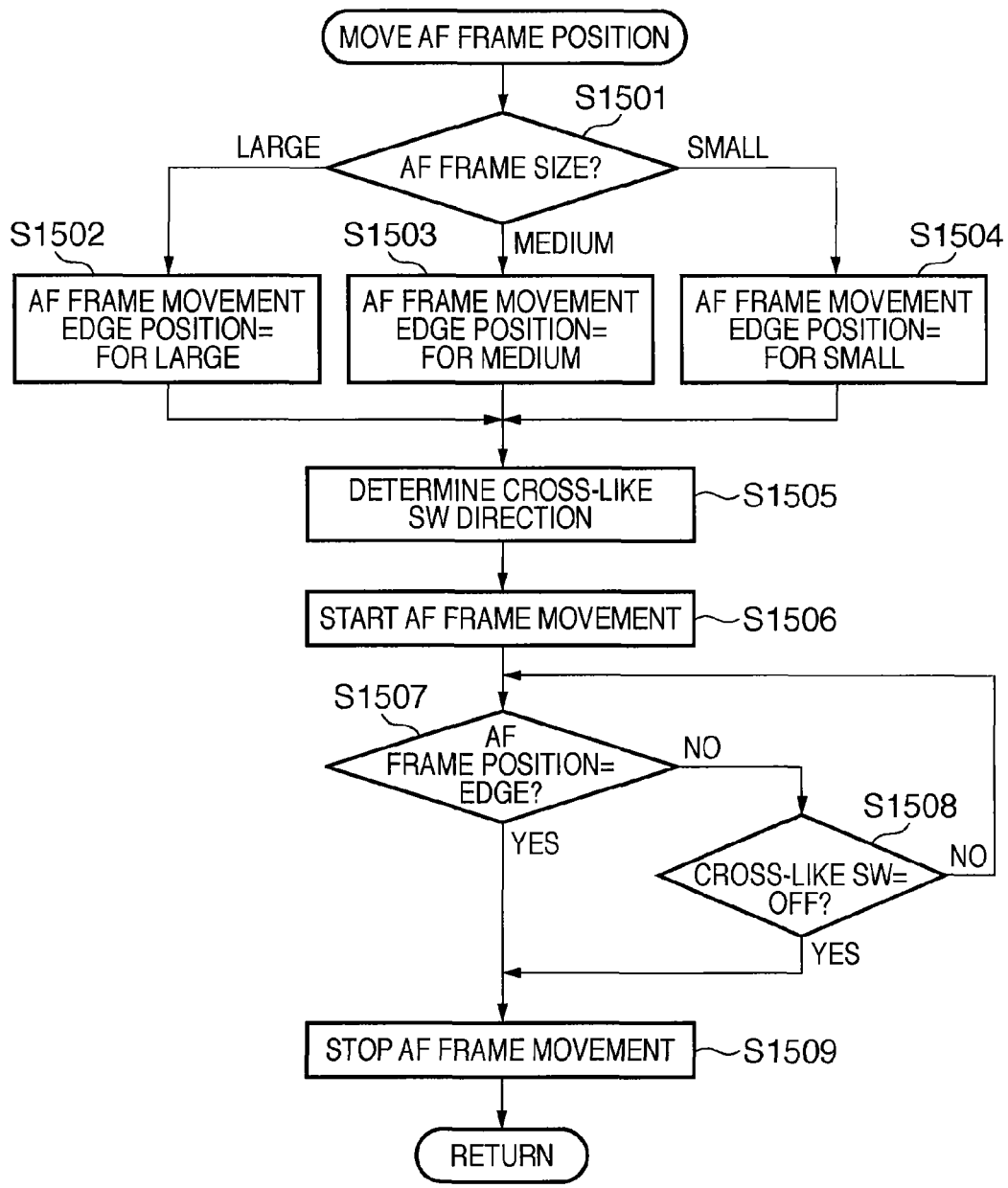
FIG. 15 is a flowchart that illustrates the AF frame position movement processing in FIG. 14.

Next is a description of the AF frame position movement processing performed in Step S1411 in FIG. 14, with reference to the flowchart in FIG. 15. This processing is performed by the CPU 60 in response to operation of the cross switch 130, according to a program stored in the program memory 125. Accordingly, the CPU 60 and the cross switch 130 function as a changing means when changing the position.

First, in Step S1501, the AF frame size stored in the working memory 126 is checked. If "large", processing advances to Step S1502, if "medium", processing advances to Step S1503, and if "small", processing advances to Step S124. In Step S1502, the top/bottom/left/right movement edge positions of the AF frame (movement border position of the AF frame in the frame of the EVF 128) are set to those when the AF frame size is "large", and stored in the working memory 126. In Step S1503, the top/bottom/left/right movement edge positions of the AF frame are set to those when the AF frame size is "medium", and stored in the working memory 126. In Step S1504, the top/bottom/left/right movement edge positions of the AF frame are set to those when the AF frame size is "small", and stored in the working memory 126. These movement edge positions are fixed for each size of the AF frame, so they are held in advance associated with the size of the AF frame in the program memory 125, an internal memory (not shown) of the CPU 60, or the like, and can be set by reading out.

The AF frame movement edge positions are set in the following manner in Steps S1502 to S1504 in FIG. 15.

Figure 19:
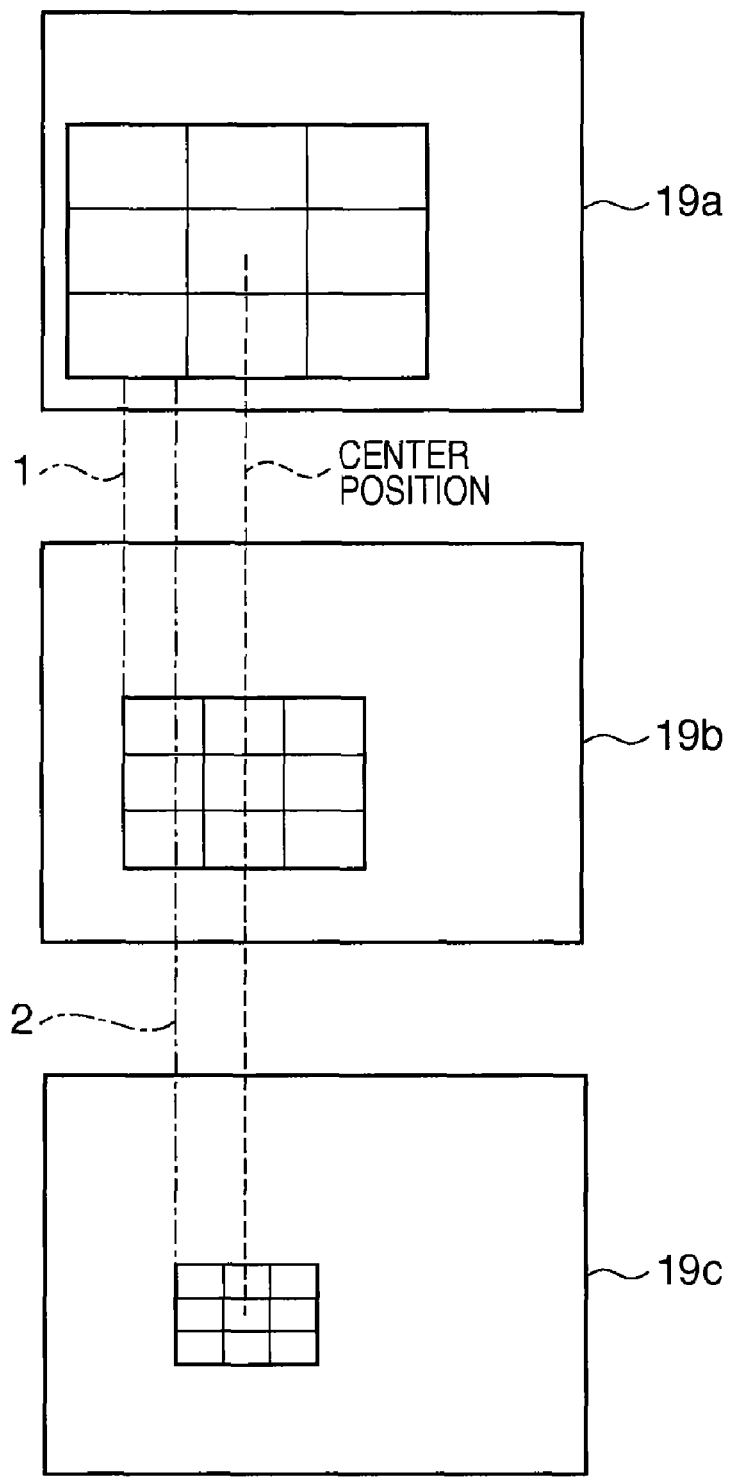
FIG. 19 illustrates AF frame movement edge positions in the AF frame position movement processing.

First, when the AF frame size is "large", the top/bottom/left/right edges of the frame are used as the movement edge positions (19*a* in FIG. 19). When the AF frame size is "medium", the movement edge positions are set at positions where the center position of the nine AF frames is the same as the center position of the nine AF frames when the AF frame size is "large". That is, the movement edge position of the left side of the nine AF frames when the AF frame size is "medium" is the position of the dotted broken line indicated by (1) in 19*b* of FIG. 19. Likewise, when the AF frame size is "small", the movement edge positions are set at positions where the center position of the nine AF frames is the same as the center position of the nine AF frames when the AF frame size is "large". That is, the movement edge position of the left side of the nine AF frames when the AF frame size is "small" is the position of the dotted broken line indicated by (2) in 19*c* of FIG. 19. FIG. 19 illustrates the movement edge position in the left and bottom directions, but the right and top are prescribed in the same manner.

In this way, by prescribing the movement edge position with the center position as a reference and not according to the AF frame size, when changing the AF frame size at the edge of the frame, it is possible to easily capture the object. That is, even when changing the AF frame size when capturing the object in the center of the nine AF frames, the center position of the nine AF frames does not change, so it is possible avoid the object moving out of the AF frame, or approaching the edge of the AF frame.

In Step S1505, the operating state of the cross switch 130 is checked; that is, a judgment is made of which button, i.e. up/down/left/right, has been pressed, and in Step S1506, movement of the AF frame in the direction judged in Step S1505 is started. For example, if the right button of the cross switch 130 is pressed, the AF frame is moved in the right direction. In Step S1507, a check is performed of whether a corner position of any of the nine AF frames that started to move in Step S1506 has arrived at the movement edge position set in any of Steps S1502 to S1504; if so, the processing advances to Step S1509, and if not, the processing advances to Step S1508. In Step S1508, a check is performed of whether depression of the cross switch 130 is continuing, and if continuing, movement of the AF frame is continued, processing returns to Step S1507, and a check is performed for arrival at the movement edge position. On the other hand, if the cross switch 130 is off, processing advances to Step S1509 and movement of the AF frame is stopped.

Figure 18A:
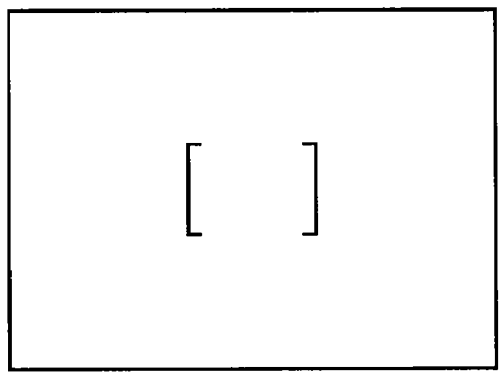
FIG. 18A illustrates the way that the AF frame is displayed when the AF frame has been set.
Figure 18B:
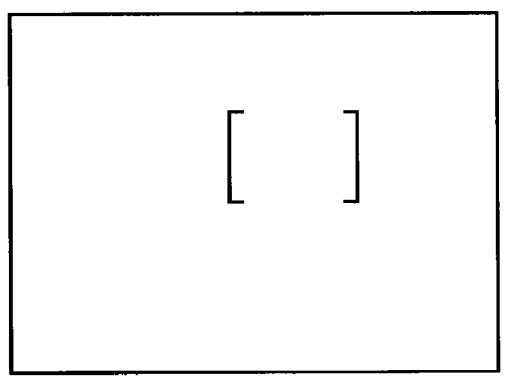
FIG. 18B illustrates the way that the AF frame is displayed when the AF frame has been set after moving the AF frame.

FIG. 17B shows an example in which the AF frame shown in FIG. 17A is moved to the upper right by the above operation of the cross switch 130. In this state, when the AF frame setting switch 132 is depressed, processing advances from Step S1403 to Step S1404 in FIG. 14, STATUS is changed to "fixed", and in Step S1408 the display changes to a display as shown in FIG. 18B.

Next is a description of the AF frame size change processing performed in Step S1413 in FIG. 14, with reference to the flowchart in FIG. 16. This processing is performed by the CPU 60 in response to operation of the AF frame size change switch 133, according to a program stored in the program memory 125. Accordingly, the CPU 60 and the AF frame size change switch 133 function as a changing means when changing the size.

First, in Step S1601, the size of the present AF frame stored in the working memory 126 is checked; if "large", processing advances to Step S1605, the AF frame size is changed from "large" to "medium", and after the change, the AF frame size is stored in the working memory 126. If not "large", processing advances to Step S1602, and a judgment is made of whether the size of the present AF frame stored in the working memory 126 is "medium". If "medium", processing advances to Step S1603, the size of the AF frame is changed from "medium" to "small", and after the change, the AF frame size is stored in the working memory 126. Also, in Step S1602, if judged that the size of the present AF frame is not "medium", processing advances to Step S1604, the AF frame size is changed from "small" to "large", and after the change, the AF frame size is stored in the working memory 126.

In this way, each time that the AF frame size change switch 133 is pressed, the AF frame size is changed from large to medium to small to large.

Figure 17C:
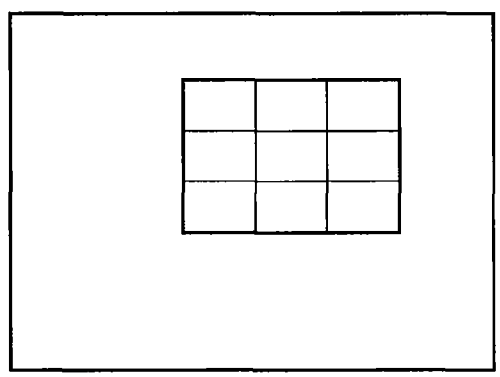
FIG. 17C shows an example display when the size of the AF frame has been changed in the AF frame setting mode.
Figure 18C:
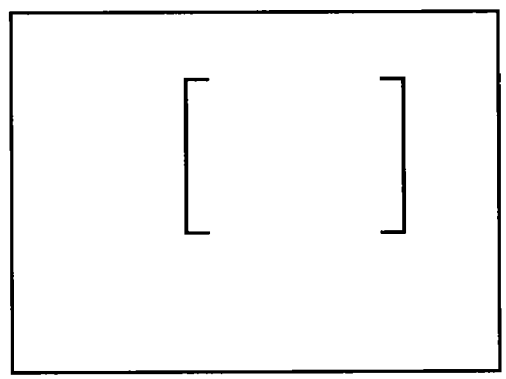
FIG. 18C illustrates the way that the AF frame is displayed when the AF frame has been set after moving the AF frame and changing the size of the AF frame.

FIG. 17C shows an example of a case where in the state shown in FIG. 173, an AF frame with size "small" is changed to "medium". In this state, when the AF frame setting switch 132 is depressed, processing advances from Step S1403 to Step S1404 in FIG. 14, STATUS is changed to "fixed", and in Step S1408, the display changes to a display as shown in FIG. 18C.

According to this embodiment as described above, when changing the position and size of the AF frames (AF frame setting mode), all of the AF frames are displayed, so it is possible to visually confirm the position and size of all AF frames. Accordingly, the photographer can easily set the AF frames to a desired position and size. Also, after fixing the position and size (when not in the AF frame setting mode), using a plurality of AF frames as one group, and a display is performed as an indicator such that the overall position and size of that group is understood. Thus, while confirming the approximate position and size of the AF frame when capturing, it is possible to frame the image without obstructing visibility of the object.

In the above description, a case was described in which there are nine AF frames, but of course the same effects are obtained even if the number of AF frames changes. Furthermore, the same is true in the case of one AF frame.

Also, a configuration may be adopted in which the type and number of AF frames can be changed by the user.

Third Embodiment

Next is a description of a third embodiment of the invention.

In the above second embodiment, when moving the AF frame, end positions are prescribed using the center position as a reference, and not according to the AF frame size, a configuration may also be adopted in which it is possible to move to the edge of the frame regardless of the AF frame size. Next is a description of a case in which this sort of configuration is adopted.

In the third embodiment, the configuration of the image capturing apparatus and the basic procedure for changing the position and size of the AF frame, are the same as described with reference to FIGS. 13 and 14, so a description thereof is omitted here.

Figure 20:
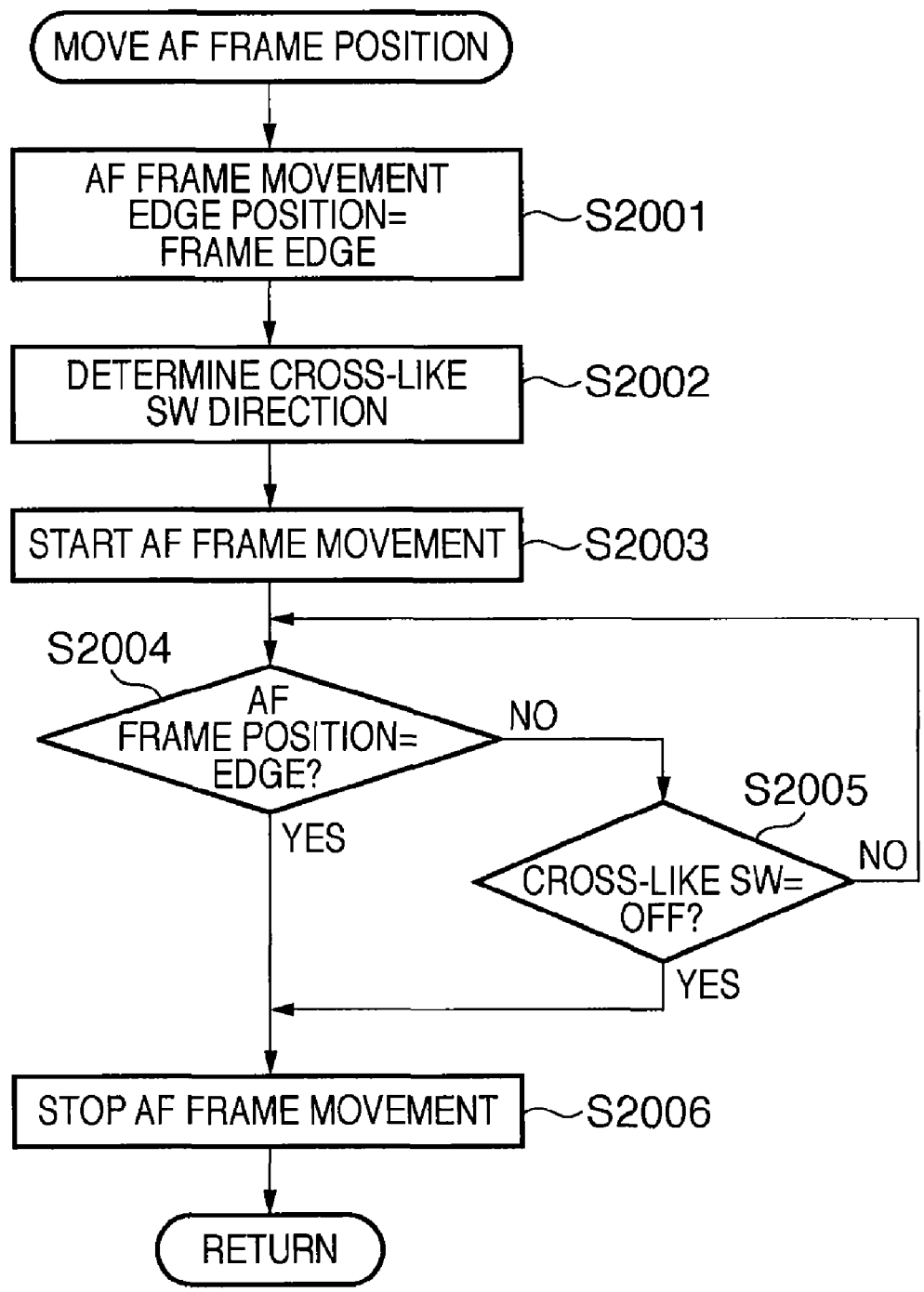
FIG. 20 is a flowchart that illustrates the AF frame position movement processing in FIG. 14.

FIG. 20 is a flowchart that shows the AF frame position movement processing performed in Step S1411 in FIG. 14 in this embodiment, and is performed instead of the processing described with reference to FIG. 15 in the second embodiment.

First, in Step S2001, the movement edge positions of the AF frame are set to the edges of the viewfinder frame, and stored in the working memory 126. In Step S2002, the operating state of the cross switch 130 is checked; that is, a judgment is made of which button, i.e. up/down/left/right, has been pressed, and in Step S2003, movement of the AF frame in the direction judged in Step S2002 is started. For example, if the right button of the cross switch 130 is pressed, the AF frame is moved in the right direction. In Step S2004, a check is performed of whether a corner position of any of the nine AF frames that started to move in Step S2003 has arrived at the movement edge position set in Step S2001; if so, the processing advances to Step S2006, and if not yet arrived, the processing advances to Step S2005. In Step S2005, a check is performed of whether depression of the cross switch 130 is continuing, and if continuing, movement of the AF frame is continued, processing returns to Step S2004, and a check is performed for arrival at the movement edge position. On the other hand, if the cross switch 130 is off, processing advances to Step S2006 and movement of the AF frame is stopped.

By controlling in the above manner, it is possible to move the AF frame to edge of the viewfinder frame regardless of the AF frame size.

FIG. 21 is a flowchart that shows the AF frame size change processing performed in Step S1413 in FIG. 14 in this third embodiment, and is performed instead of the processing described with reference to FIG. 16 in the second embodiment.

First, in Step S2101, the size of the present AF frame stored in the working memory 126 is checked; if "large", processing advances to Step S2105, the AF frame size is changed from "large" to "medium", and after the change, the AF frame size is stored in the working memory 126. If not "large", processing advances to Step S2102, and a judgment is made of whether or not the size of the present AF frame stored in the working memory 126 is "medium". If "medium", processing advances to Step S2103, the size of the AF frame is changed from "medium" to "small", and after the change, the AF frame size is stored in the working memory 126. Also, in Step S2102, if judged that the size of the present AF frame is not "medium", processing advances to Step S2104, the AF frame size is changed from "small" to "large", and after the change, the AF frame size is stored in the working memory 126 and processing advances to Step S2106.

In Step S2106, when the AF frame size is changed from "small" to "large", a check is performed of whether the edge position of the AF frame exceeds the viewfinder frame edge, i.e. protrudes out of the viewfinder frame; if so, processing advances to Step S2107, and if not, this processing ends. In Step S2107, the AF frame is moved to the inside until the AF frame does not protrude out of the viewfinder frame.

With this configuration, regardless of the AF frame size, when the AF frame has moved to the edge of the viewfinder frame, when the AF frame size has changed from "small" to "large", the edge position of the AF frame does not protrude out of the viewfinder frame, and stays within the viewfinder frame. Thus, regardless of which AF frame size has been selected, it is possible to match the AF frame to an object positioned at the edge of the viewfinder frame, so freedom of framing increases, and thus camera operability increases.

In the above example, a case was described in which when the AF frame protrudes from the viewfinder frame after the AF frame size is changed, the AF frame is moved to a position where the AF frame does not protrude, but this is not a limitation on the invention. For example, a configuration may be adopted in which when the AF frame protrudes from the viewfinder frame, the size is not changed, or in which when the size of the focus adjustment region can be set as desired, the size can be changed up to a maximum size that does not protrude from the viewfinder frame. Furthermore, when composed of a plurality of AF frames, it is possible to reduce the number of AF frames such that at least an AF frame that protrudes from the viewfinder frame is not used.

Other Embodiments

Also, the objects of each embodiment may be attained also by the following sort of method. That is, a storage medium (or recording medium) on which is recorded program code of software that realizes the functions of the above embodiments is provided in a system or an apparatus. A computer (or CPU or MPU) of that system or apparatus reads out and executes the program code stored on the storage medium. In this case, the program code itself that has been read out from the storage medium realizes the functions of the above embodiments, and thus the storage medium on which that program code is stored constitutes the invention. Also, in addition to the functions of the above embodiments realized by the computer executing the program code that is read out, the invention also encompasses the following sort of case. Specifically, based on instructions of the program code, an operating system (OS) or the like operating on the computer performs some or all of actual processing, and the functions of the above embodiments are realized by this processing.

Further, the invention also encompasses the following sort of case. Specifically, the program code read out from the storage medium is written to a memory provided in a function expansion card inserted in the computer or a function expansion unit connected to the computer. Afterward, based on instructions of the program code, a CPU or the like provided in that function expansion card or function expansion unit performs some or all of actual processing, and the functions of the above embodiments are realized by this processing.

When the invention is applied to the above storage medium, program code corresponding to the previously described procedures is stored on that storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-202237 filed on Aug. 2, 2007 and 2007-203407 filed on Aug. 3, 2007, which are hereby incorporated by reference herein in their entirety.

What is claimed is:

1. An image capturing apparatus, comprising:
an image sensor that photo-electrically converts an object image formed by an optical lens,
a focus detection unit that detects the focus state of the object image using an image signal from a focus detection region within a frame of the image sensor,
a setting unit that sets the focus detection region in accordance with a focus detection mode that is selected by a user from a plurality of focus detection modes including a first focus detection mode and a second focus detection mode, and
a storage unit that stores at least one of the size and the position of the focus detection region for the case that the first focus detection mode is selected and the case that the second focus detection mode is selected respectively,
wherein the setting unit sets one focus detection region when the first focus detection mode is selected and sets a plurality of focus detection regions when the second focus detection mode is selected, and wherein at least one of the size and the position of the plurality of focus detection regions is changed together as one group when the second focus detection mode is selected.

2. The image capturing apparatus according to claim 1, wherein in the case that the first focus detection mode is selected, at least one of the size and the position of the one focus detection region can be changed.

3. The image capturing apparatus according to claim 1, wherein the range in which the position of the focus detection region can move differs between the case that the first focus detection mode is selected and the case that the second focus detection mode is selected.

4. The image capturing apparatus according to claim 1, wherein when turning off power of the image capturing apparatus, information of at least one of the size and the position of the focus detection region stored in the storage unit is reset.

5. The image capturing apparatus according to claim 1, wherein the image capturing apparatus has a function to play back a captured image that the image capturing apparatus captured, and when playing back the captured image, information of at least one of the size and the position of the focus detection region that is stored in the storage unit is reset.

6. The image capturing apparatus according to claim 1, further comprising an object information storage unit that stores object information indicating the state of the object in a capture operation of the image capturing apparatus, and a determination unit that compares the object information stored in the object information storage unit with object information for present capture and determines whether or not there is a change in the state of the object, wherein when determined by the determination unit that there is no change in the state of the object, sets at least one of the size and the position of the focus detection region that is stored in the storage unit when performing the present capture.

7. The image capturing apparatus according to claim 1, further comprising a placement information storage unit that stores placement information indicating the placement state in a capture operation of the image capturing apparatus, and a determination unit that compares the placement information stored in the placement information storage unit with placement information for present capture and determines whether or not there is a change in the placement state, wherein when determined by the determination unit that there is no change in the placement state, sets at least one of the size and the position of the focus detection region stored in the storage unit when performing the present capture.

8. The image capturing apparatus according to claim 1, further comprising a display unit that displays an object image obtained by the image sensor, and an indicator that indicates the focus detection region,
wherein the display unit, when at least one of the size and the position of the plurality of focus detection regions is changed in the second focus detection mode, changes display of the indicator that indicates the focus detection region to display of an indicator whose outer shape is emphasized.

9. The image capturing apparatus according to claim 1, wherein the image capturing apparatus has a function to store the optical lens within the body of the image capturing apparatus, and when storing the optical lens, information of at least one of the size and the position of the focus detection region that is stored in the storage unit is reset.

10. A method for controlling an image capturing apparatus provided with an image sensor that photo-electrically converts an object image formed by an optical lens, the method comprising:
a focus detection step of detecting the focus state of the object image using an image signal from a focus detection region within a frame of the image sensor,
a setting step of setting the focus detection region in accordance with a focus detection mode that is selected by a user from a plurality of focus detection modes including a first focus detection mode and a second focus detection mode, and
a storage step of storing, in the case that the first focus detection mode is selected and the case that the second focus detection mode is selected respectively, at least one of the size and the position of the focus detection region,
wherein in the setting step, one focus detection region is set when the first focus detection mode is selected and a plurality of focus detection regions are set when the second focus detection mode is selected, and
wherein it is capable to change at least one of the size and the position of the plurality of focus detection regions together as one group when the second focus detection mode is selected.

* * * * *